(12) United States Patent
Yano et al.

(10) Patent No.: US 11,485,747 B2
(45) Date of Patent: *Nov. 1, 2022

(54) DIPHENYLMETHANE PROTECTIVE AGENT

(71) Applicant: SEKISUI MEDICAL CO., LTD., Tokyo (JP)

(72) Inventors: Shinya Yano, Chuo-ku (JP); Hideki Kubota, Chuo-ku (JP)

(73) Assignee: SEKISUI MEDICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,668

(22) Filed: Oct. 20, 2020

(65) Prior Publication Data

US 2021/0040128 A1    Feb. 11, 2021

Related U.S. Application Data

(62) Division of application No. 16/307,105, filed as application No. PCT/JP2017/022525 on Jun. 19, 2017, now Pat. No. 10,851,120.

(30) Foreign Application Priority Data

Jun. 20, 2016 (JP) .............................. JP2016-121986
Nov. 10, 2016 (JP) .............................. JP2016-219631

(51) Int. Cl.
*C07F 7/18*    (2006.01)
*C07B 51/00*   (2006.01)

(52) U.S. Cl.
CPC ............ *C07F 7/1804* (2013.01); *C07B 51/00* (2013.01); *C07F 7/18* (2013.01); *Y02P 20/55* (2015.11)

(58) Field of Classification Search
CPC .......... C07F 7/1804; C07F 7/18; C07B 63/04; C07B 51/00; C07C 43/23; C07C 211/27; C07C 265/08; Y02P 20/55
See application file for complete search history.

(56) References Cited

U.S. PATENT DOCUMENTS

| | | | |
|---|---|---|---|
| 4,801,719 A | 1/1989 | Oertle et al. | |
| 5,475,126 A * | 12/1995 | Yoshida | A61K 8/585 424/59 |
| 5,874,532 A * | 2/1999 | Pieken | C07H 21/00 536/25.3 |
| 6,001,966 A | 12/1999 | Pieken et al. | |
| 9,212,130 B2 | 12/2015 | Kai et al. | |
| 10,851,120 B2 * | 12/2020 | Yano | C07F 7/1804 |
| 10,870,667 B2 * | 12/2020 | Yano | C07C 43/23 |

(Continued)

FOREIGN PATENT DOCUMENTS

| | | |
|---|---|---|
| CN | 103080058 | 5/2013 |
| CN | 103140221 | 6/2013 |

(Continued)

OTHER PUBLICATIONS

S. Chandrudu et al., 18 Molecules, 4373-4388 (2013) (Year: 2013).*

(Continued)

*Primary Examiner* — Alexander R Pagano
(74) *Attorney, Agent, or Firm* — Oblon, McClelland, Maier & Neustadt, L.L.P.

(57) ABSTRACT

An object of the present invention is to develop a protecting group, which can prevent solidification or insolubilization of a compound by protecting a functional group to achieve easy separation and purification after a reaction.

A diphenylmethane compound represented by general formula (1):

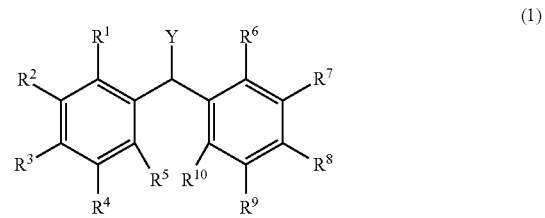

(1)

wherein Y represents —$OR^{19}$ (wherein $R^{19}$ represents a hydrogen atom or an active ester-type protecting group), —$NHR^{20}$ (wherein $R^{20}$ represents, for example, a hydrogen atom, a $C_{1-6}$ linear or branched alkyl group, or an aralkyl group, at least one of $R^1$ to $R^{10}$ represents a group represented by formula (2):

$$—O—R^{11}—X\text{-}A \qquad (2)$$

and the others each independently represent a hydrogen atom, a halogen atom, a $C_{1-4}$ alkyl group, or a $C_{1-4}$ alkoxy group; $R^{11}$ represents a $C_{1-16}$ linear or branched alkylene group; X represents O or $CONR^{21}$ (wherein $R^{21}$ represents a hydrogen atom, or a $C_{1-4}$ alkyl group; and A represents, for example, a group represented by formula (3).

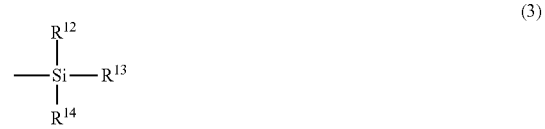

(3)

20 Claims, 1 Drawing Sheet

(56) References Cited

U.S. PATENT DOCUMENTS

| | | | |
|---|---|---|---|
| 10,981,940 B2* | 4/2021 | Yano | C07F 7/18 |
| 2004/0033317 A1* | 2/2004 | Baudin | C07C 49/84 |
| | | | 427/498 |
| 2004/0116685 A1* | 6/2004 | Pieken | C07C 43/225 |
| | | | 536/25.3 |
| 2005/0048496 A1 | 3/2005 | Dellinger et al. | |
| 2010/0249374 A1 | 9/2010 | Takahashi | |
| 2012/0059149 A1 | 3/2012 | Takahashi | |
| 2014/0197132 A1* | 7/2014 | Kang | C08F 293/00 |
| | | | 216/48 |
| 2018/0050983 A1* | 2/2018 | Kanbara | C08L 101/02 |

FOREIGN PATENT DOCUMENTS

| | | | |
|---|---|---|---|
| EP | 1 510 522 A1 | 3/2005 | |
| EP | 2415745 | 2/2012 | |
| EP | 3 342 777 A1 | 7/2018 | |
| JP | 61-91193 A | 5/1986 | |
| JP | 2000-500740 A | 1/2000 | |
| WO | WO 97/14706 A1 | 4/1997 | |
| WO | WO 98/14910 | 10/1998 | |
| WO | WO 2010/113939 A1 | 10/2010 | |
| WO | WO 2012/029794 A1 | 3/2012 | |
| WO | WO 2016/143870 A1 | 9/2016 | |
| WO | WO 2017/038650 A1 | 3/2017 | |

OTHER PUBLICATIONS

V. Snieckus et al., 31 Tetrahedron Letters, 4267-4270 (1990) (Year: 1990).*

D. Reynolds et al., 57 Tetrahedron, 7765-7770 (2001) (Year: 2001).*

W. Liu et al., 52 Chem. Commun., 13120-13123 (2016) (Year: 2016).*

T. Nagashima et al., Journal of the American Chemical Society, 2695-2696 (2001) (Year: 2001).*

Korean Office Action dated Oct. 21, 2021 in Korean Patent Application No. 10-2018-7033042 (with unedited computer generated English translation), 11 pages.

STNext Registry CAS No. 189941-09-1, (Jun. 17, 1997.), 3 pages.

International Search Report dated Sep. 12, 2017 in PCT/JP2017/022525 Filed on Jun. 19, 2017.

Registry(STN) [online] CAS No. 1027024-00-5 Nov. 26, 2017, 1 page.

Extended European Search Report dated Jan. 20, 2020 in European Patent Application No. 17815357.3, 8 pages.

Database CA [Online] Chemical Abstracts Service, Columbus, Ohio, US; 1997, XP002796694, Database Accession No. 126:343816, 2 pages.

Nagashima, T., et al., "Catalytic Asymmetric Solid-Phase Cyclopropanation", J. Am. Chem. Soc. 2001, vol. 123, No. 11, pp. 2695-2696 & Nagashima, T., et al., "Catalytic Asymmetric Cyclopropanation in Solid-Phase Supporting Information", J. Am. Chem. Soc., 2001, pp. 1-12.

Database CA [Online] Chemical Abstracts Service, Columbus, Ohio, US; 2006, XP002796695, Database Accession No. 146:184216, 1 page.

Database CA [Online] Chemical Abstracts Service, Columbus, Ohio, US; 2004, XP002796696, Database Accession No. 141:350037, 3 pages.

Mee-Kyung Chung, et al., "Bis(ether) derivatives of tetrakis(2-hydroxyphenyl)ethene—Direct synthesis of (E)- and (Z)-bis(2-hydroxyphenyl)-bis(2-methoxyphenyl)ethene via the McMurry olefination reaction", Canadian Journal of Chemistry, 2006, 84(10): 1250-1253.

Office Action dated Aug. 5, 2020 for Chinese Patent Application No. 201780037861.9 (with machine translation obtained through Espacenet).

* cited by examiner

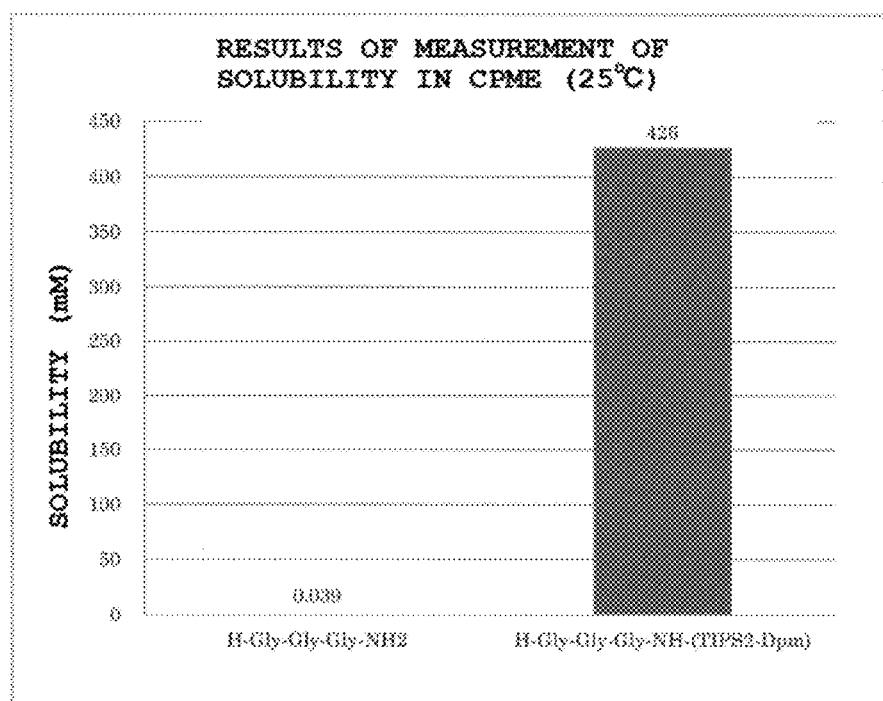

DIPHENYLMETHANE PROTECTIVE AGENT

CROSS REFERENCE TO RELATED APPLICATIONS

This application is a divisional application of U.S. application Ser. No. 16/307,105, filed on Dec. 4, 2018, which is a national stage entry of International Application PCT/JP2017/022525, filed on Jun. 19, 2017, and claims foreign priority from Japanese Patent Application No. 2016-219631, filed on Nov. 10, 2016, and Japanese Patent Application No. 2016-121986, filed on Jun. 20, 2016, the entire contents of which are incorporated herein by reference.

FIELD OF THE INVENTION

The present invention relates to a novel diphenylmethane compound useful as a protective agent for a carboxy group, a hydroxy group, a diol group, an amino group, an amide group, and a mercapto group.

BACKGROUND OF THE INVENTION

In synthesis of peptides or various compounds, protection of functional groups such as a carboxy group, a hydroxy group, a diol group, an amino group, an amide group, and a mercapto group may be required for carrying out the reaction. Desirable protecting groups for the protection include those, which can protect functional groups by an easy process and be eliminated under moderate conditions. For example, benzyl esters (Bn) and tert-butyl ester are known as carboxy protecting groups. Recently, it is reported that benzyl alcohol-based compounds and diphenylmethane-based compounds are useful as protecting groups (Patent Literatures 1 and 2).

CITATION LIST

Patent Literatures

Patent Literature 1: WO 2012/029794 A
Patent Literature 2: WO 2010/113939 A

SUMMARY OF THE INVENTION

Problem to be Solved by the Invention

However, there is a drawback that a compound in which a functional group is protected with a conventional protecting group can easily be precipitated. Specifically, in peptide synthesis, since such a compound becomes insoluble in even an organic solvent, separation and purification of the compound after the reaction often become difficult. These difficulties in separation and purification are serious problems in peptide synthesis in which condensation reactions are carried out successively.

Accordingly, an object of the present invention is to provide a protective agent, which protects a functional group of a compound, which leads to dissolution of the compound in an organic solvent without solidification or insolubilization, which allows easy separation and purification of the compound after a reaction.

Means for Solving the Problem

The present inventors have made investigations on various substituents of a diphenylmethane compound, which results in development of a compound having a trialkylsilyloxy substituent at the end of an oxyalkylene group by which the substituent is connected to a benzene ring of a diphenylmethane compound. The present inventors have found that a compound in which a functional group is protected with the above diphenylmethane compound is hardly precipitated in an organic solvent and easily separated and purified by a liquid-liquid phase separation operation, and thus the compound is useful as a protective agent, and consequently have made the present invention.

That is, the present invention provides the following [1] to [9].

[1] A diphenylmethane compound represented by general formula (1):

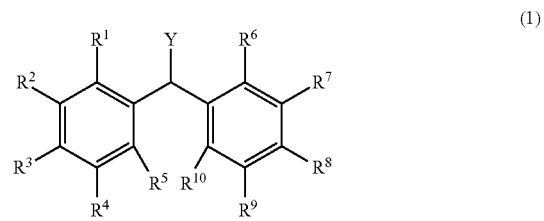

(1)

wherein Y represents $-OR^{19}$ (wherein $R^{19}$ represents a hydrogen atom or an active ester-type protecting group), $-NHR^{20}$ (wherein $R^{20}$ represents a hydrogen atom, a $C_{1-6}$ linear or branched alkyl group, or an aralkyl group), an azide, a halogen atom, an oxime combined with a methylene group, or a carbonyl group combined with a methylene group, and at least one of $R^1$ to $R^{10}$ represents a group represented by formula (2):

$$-O-R^{11}-X-A \quad (2)$$

and the others each independently represent a hydrogen atom, a halogen atom, a $C_{1-4}$ alkyl group, or a $C_{1-4}$ alkoxy group; $R^{11}$ represents a $C_{1-16}$ linear or branched alkylene group; X represents O or $CONR^{21}$ (wherein $R^{21}$ represents a hydrogen atom or a $C_{1-4}$ alkyl group); and A represents a group represented by formula (3), (4), (5), (6), (7), (8), (9), (10), (11), (12), or (13):

(3)

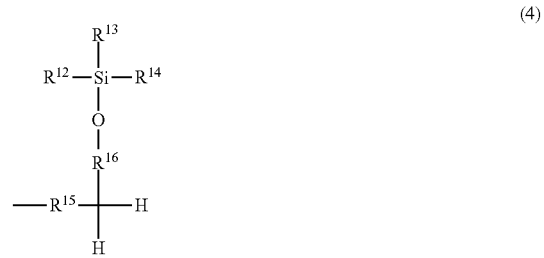

(4)

-continued (5)
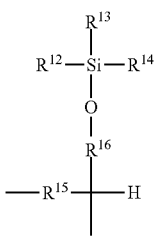

(6)
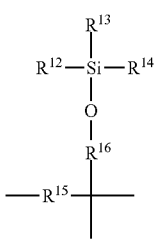

(7)
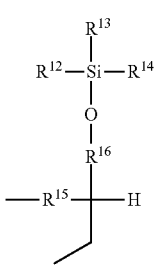

(8)
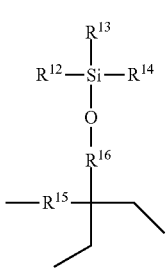

(9)
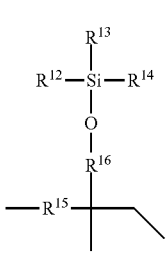

(10)
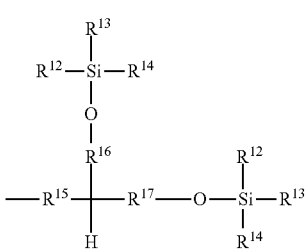

(11)

$$\begin{array}{c} R^{13} \\ | \\ R^{12}-Si-R^{14} \\ | \\ O \\ | \\ R^{16} \quad\quad R^{12} \\ | \quad\quad\quad | \\ -R^{15}-\!\!\!\!\!\!\!\!\!\!-R^{17}-O-Si-R^{13} \\ | \\ R^{14} \end{array}$$

(12)

$$\begin{array}{c} R^{13} \\ | \\ R^{12}-Si-R^{14} \\ | \\ O \\ | \\ R^{16} \quad\quad R^{12} \\ | \quad\quad\quad | \\ -R^{15}-\!\!\!\!\!\!\!\!\!\!-R^{17}-O-Si-R^{13} \\ | \\ R^{14} \end{array}$$

(13)

$$\begin{array}{c} R^{13} \\ | \\ R^{12}-Si-R^{14} \\ | \\ O \\ | \\ R^{16} \quad\quad R^{12} \\ | \quad\quad\quad | \\ -R^{15}-\!\!\!\!\!\!\!\!\!\!-R^{17}-O-Si-R^{13} \\ | \quad\quad\quad | \\ R^{18} \quad\quad R^{14} \\ | \\ O \\ | \\ R^{14}-Si-R^{12} \\ | \\ R^{13} \end{array}$$

wherein $R^{12}$, $R^{13}$, and $R^{1}$ may be the same or different and each independently represent a $C_{1-4}$ linear or branched alkyl group or an optionally substituted aryl group; $R^{15}$ represents a single bond or a $C_{1-3}$ linear or branched alkylene group, and $R^{16}$, $R^{17}$, and $R^{18}$ each independently represent a $C_{1-3}$ linear or branched alkylene group.

[2] The diphenylmethane compound according to [1], wherein Y is —$OR^{19}$ (wherein $R^{19}$ represents a hydrogen atom), —$NHR^{20}$ (wherein $R^{20}$ represents a hydrogen atom, a $C_{1-6}$ linear or branched alkyl group, or an aralkyl group), an azide, a halogen atom, an oxime combined with a methylene group, or a carbonyl group combined with a methylene group.

[3] The diphenylmethane compound according to [1], wherein Y is —$OR^{19}$ (wherein $R^{1}$ represents a hydrogen atom or an active ester-type protecting group), —$NHR^{20}$ (wherein $R^{20}$ represents a hydrogen atom, a $C_{1-6}$ linear or branched alkyl group, or an aralkyl group), an azide, a halogen atom, or an oxime combined with a methylene group.

[4] The diphenylmethane compound according to [1], wherein Y is —$OR^{19}$ (wherein $R^{1}$ represents a hydrogen atom), —$NHR^{20}$ (wherein $R^{20}$ represents a hydrogen atom, a $C_{1-6}$ linear or branched alkyl group, or an aralkyl group), an azide, a halogen atom, or an oxime combined with a methylene group.

[5] The diphenylmethane compound according to any one of [1] to [4], wherein at least one of $R^1$ to $R^5$ and at least one of $R^6$ to $R^{10}$ are each independently a group represented by formula (2) and the others are each independently a hydrogen atom, a $C_{1-4}$ alkyl group, or a $C_{1-4}$ alkoxy group.

[6] The diphenylmethane compound according to any one of [1] to [5], wherein $R^{11}$ is a $C_{1-6}$ linear or branched alkylene group.

[7] The diphenylmethane compound according to any one of [1] to [6], wherein $R^{11}$ is a $C_{6-16}$ linear or branched alkylene group.

[8] The diphenylmethane compound according to any one of [1] to [7], wherein $R^{15}$ is a single bond or a methylene group, and $R^{16}$, $R^{17}$, and $R^{18}$ are each independently a methylene group.

[9] A protective agent for a carboxy group, a hydroxy group, a diol group, an amino group, an amide group, or a mercapto group, comprising a diphenylmethane compound according to any one of [1] to [8].

Effects of Invention

A compound in which a functional group is protected by a diphenylmethane compound (1) of the present invention readily becomes liquid and has an increased solubility in a solvent, which leads to easy separation and purification after a condensation reaction.

If insolubilization or solidification of a raw materials or an intermediate is an obstacle in a process of producing various chemicals such as medicines and agrochemicals, such problems can be solved by bonding the diphenylmethane compound (1) of the present invention to the raw materials or the intermediate compounds to increase liquidity and solubility thereof.

BRIEF DESCRIPTION OF THE DRAWINGS

FIG. 1 shows the results of measurement of solubility in cyclopentyl methyl ether (CPME).

DESCRIPTION OF THE EMBODIMENTS

A diphenylmethane compound of the present invention represented by general formula (1) is characterized in that at least one of $R^1$ to $R^{10}$ has a structure represented by formula (2). Such a structure facilitates liquefaction of a compound protected with the diphenylmethane compound (1) and significantly increases solubility in a solvent.

In general formula (1), Y represents —$OR^{19}$ (wherein $R^{19}$ represents a hydrogen atom or an active ester-type protecting group), —$NHR^{20}$ (wherein $R^{20}$ represents a hydrogen atom, a $C_{1-6}$ linear or branched alkyl group, or an aralkyl group), an azide, a halogen atom, an oxime combined with a methylene group, or a carbonyl group combined with a methylene group. Examples of the halogen atom include a fluorine atom, a bromine atom, a chlorine atom, and an iodine atom. The carbonyl group combined with a methylene group is useful as a protecting group for an amino group.

Examples of the active ester-type protecting group include an active ester-type carbonyl group and an active ester-type sulfonyl group. Examples of the active ester-type carbonyl group include a carbonyloxy succinimide, an alkoxycarbonyl group, an aryloxycarbonyl group, and an aralkyloxy carbonyl group, and more preferred is, for example, a carbonyloxy succinimide.

Examples of the active ester-type sulfonyl group include an alkylsulfonyl group and an arylsulfonyl group, and more preferred are, for example, a $C_1$-$C_6$ alkylsulfonyl group and a p-toluenesulfonyl group.

Y is preferably —$OR^{19}$ (wherein $R^{19}$ represents a hydrogen atom), —$NHR^{20}$ (wherein $R^{20}$ represents a hydrogen atom, a $C_{1-6}$ linear or branched alkyl group, or an aralkyl group), or a halogen atom.

The diphenylmethane compound of the present invention refers to a group in which at least one of $R^1$ to $R^{10}$ is represented by formula (2). Inter alia, in view of solubility of a protecting group-introduced compound and removal of the protecting group, preferred is a group in which 1 to 4 of $R^1$ to $R^{10}$ are represented by formula (2), more preferred is a group in which 2 to 4 of $R^1$ to $R^{10}$ are represented by formula (2), and even more preferred is a group in which 2 to 3 of $R^1$ to $R^{10}$ are represented by formula (2). Still more preferred is a group in which at least one of $R^1$ to $R^5$ and at least one of $R^6$ to $R^{20}$ are each independently a group represented by formula (2).

The others are each independently a hydrogen atom, a halogen atom, a $C_{1-4}$ alkyl group, or a $C_{1-4}$ alkoxy group. Examples of the other halogen atoms represented by $R^1$ to $R^{10}$ include a fluorine atom, a chlorine atom, and a bromine atom. Inter alia, preferred is a chlorine atom. Examples of the other $C_{1-4}$ alkoxy group include a methoxy group, an ethoxy group, an n-propyloxy group, an isopropyloxy group, and an n-butyloxy group. Inter alia, preferred are a methoxy group and an ethoxy group. Examples of the $C_{1-4}$ alkyl group include a methyl group, an ethyl group, an n-propyl group, an isopropyl group, and an n-butyl group. Inter alia, preferred are a methyl group and an ethyl group.

$R^{11}$ represents a $C_{1-16}$ linear or branched alkylene group. The alkylene group is preferably a $C_{2-16}$ linear or branched alkylene group, more preferably a $C_{4-16}$ linear or branched alkylene group, even more preferably a $C_{6-16}$ linear or branched alkylene group, and still more preferably a $C_{8-14}$ linear or branched alkylene group. Specific examples of the alkylene group include a methylene group, an ethylene group, a trimethylene group, a tetramethylene group, a pentamethylene group, a hexamethylene group, a heptamethylene group, an octamethylene group, a nonamethylene group, a decamethylene group, an undecamethylene group, a dodecamethylene group, and a tetradecamethylene group.

X represents O or $CONR^{21}$.

Herein, $R^{21}$ represents a hydrogen atom or a $C_{1-4}$ alkyl group, and is preferably a hydrogen atom.

The letter A represents a group represented by formula (3), (4), (5), (6), (7), (8), (9), (10), (11), (12), or (13). $R^{12}$, $R^{13}$, and $R^{14}$ may be the same or different and each independently represent a $C_{1-6}$ linear or branched alkyl group or an optionally substituted aryl group. Herein, examples of the $C_{1-6}$ alkyl group include a methyl group, an ethyl group, an n-propyl group, an isopropyl group, an n-butyl group, an isobutyl group, a sec-butyl group, a tert-butyl group, an n-pentyl group, and an n-hexyl group. Inter alia, preferred is a $C_{1-4}$ alkyl group, and more preferred are a methyl group, tert-butyl, and an isopropyl group.

Examples of the optionally substituted aryl group include a $C_{6-10}$ aryl group. Specific examples include a phenyl group and a naphthyl group, each optionally substituted with a $C_{1-3}$ alkyl group. Inter alia, more preferred is a phenyl group.

$R^{15}$ represents a single bond or a $C_{1-3}$ linear or branched alkylene group. Examples of the $C_{1-3}$ linear or branched alkylene group include a methylene group, an ethylene group, a trimethylene group, and a propylene group. Inter alia, preferred is a single bond.

$R^{16}$, $R^{17}$, and $R^{18}$ each independently represent a $C_{1-3}$ linear or branched alkylene group. Examples of the $C_{1-3}$ linear or branched alkylene group include a methylene group, an ethylene group, a trimethylene group, and a propylene group. Inter alia, preferred is a methylene group.

More preferred is a compound represented by general formula (1) in which Y is —OR$^{19}$ (wherein R$^{19}$ represents a hydrogen atom), —NHR$^{20}$ (wherein R$^{20}$ represents a hydrogen atom, a C$_{1-6}$ linear or branched alkyl group, or an aralkyl group), or a halogen atom; at least one, and preferably 1 to 3, of R$^1$ to R$^5$ is a group represented by formula (2), at least one, and preferably 1 to 3, of R$^6$ to R$^{10}$ is a group represented by formula (2), and the others are each independently a hydrogen atom, a C$_{1-4}$ alkyl group or a C$_{1-4}$ alkoxy group; R$^{11}$ is a C$_{2-16}$ linear or branched alkylene group; R$^{15}$ is a single bond or a methylene group; and R$^{16}$, R$^{17}$, and R$^{18}$ are each independently a methylene group.

More preferred is a compound represented by general formula (1) in which R$^{11}$ is a C$_{6-16}$ linear or branched alkyl group; X is O or CONH; A is a group represented by formula (3) or (13); R$^{12}$, R$^{13}$, and R$^{14}$ are the same or different and each independently represent a C$_{1-4}$ alkyl group; R$^{15}$ is a single bond; and R$^{16}$, R$^{17}$, and R$^{18}$ are each independently a methylene group.

Herein, specific examples of those to which a group represented by formula (2) is bonded are shown below.

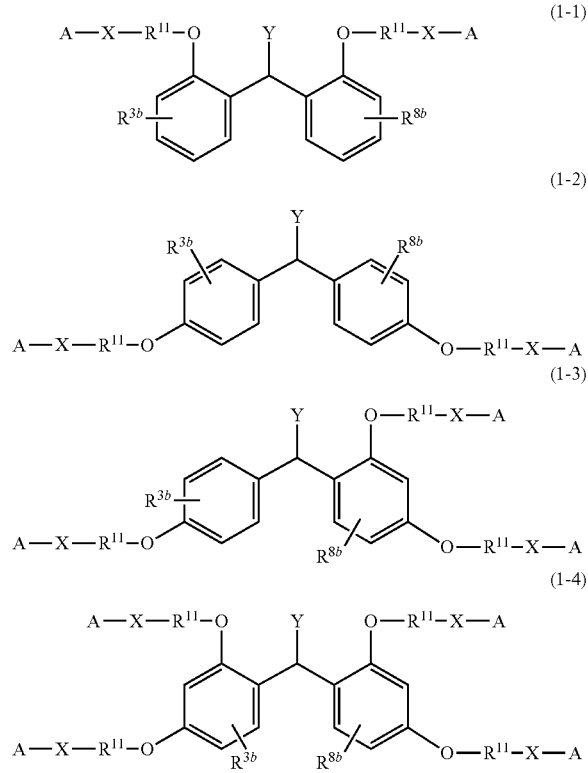

wherein R$^{3b}$ and R$^{8b}$ each independently represent a hydrogen atom, a C$_{1-4}$ alkyl group, or a C$_{1-4}$ alkoxy group, and Y, A, X, and R$^{11}$ are the same as defined above.

Specific examples of the diphenylmethane compound (1) of the present invention include the following (a) to (e). In (a) to (e), Y represents —OR$^{19}$ (wherein R$^{19}$ represents a hydrogen atom), —NHR$^{20}$ (wherein R$^{20}$ represents a hydrogen atom, a C$_{1-6}$ linear or branched alkyl group, or an aralkyl group), or a halogen atom.

(a) TIPS2-Type-PP Protective Agent

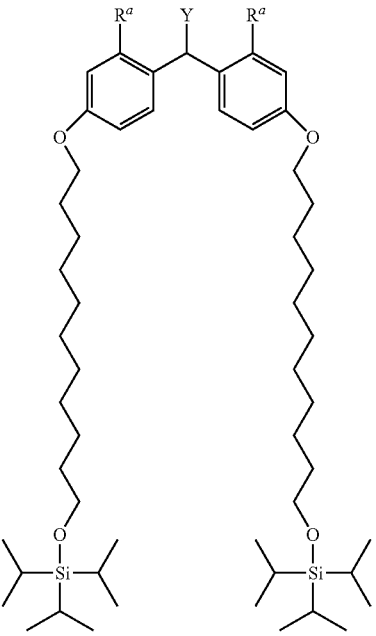

Herein, R$^a$ represents a hydrogen atom, a C$_{1-4}$ alkyl group, or a C$_{1-4}$ alkoxy group.

(b) TIPS2-Type-OO Protective Agent

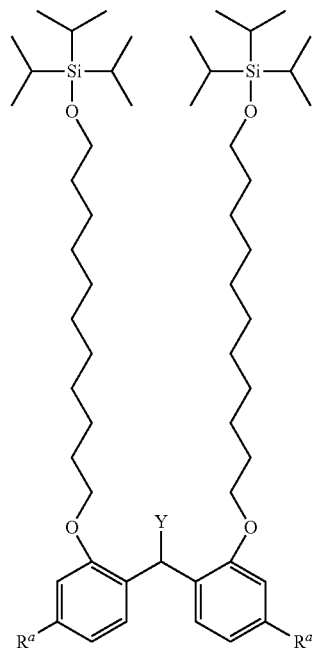

Herein, R$^a$ represents a hydrogen atom, a C$_{1-4}$ alkyl group, or a C$_{1-4}$ alkoxy group.

(c) TIPS3-Type-OPP Protective Agent
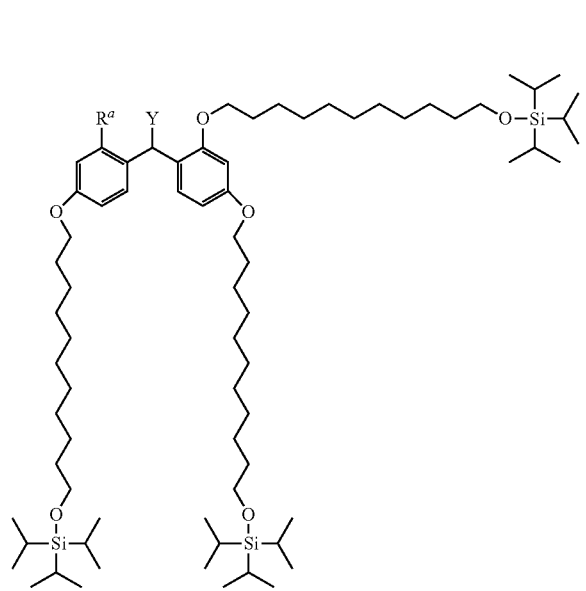
Herein, $R^a$ represents a hydrogen atom, a $C_{1-4}$ alkyl group, or a $C_{1-4}$ alkoxy group.
(c) TIPS4-Type-PP Protective Agent
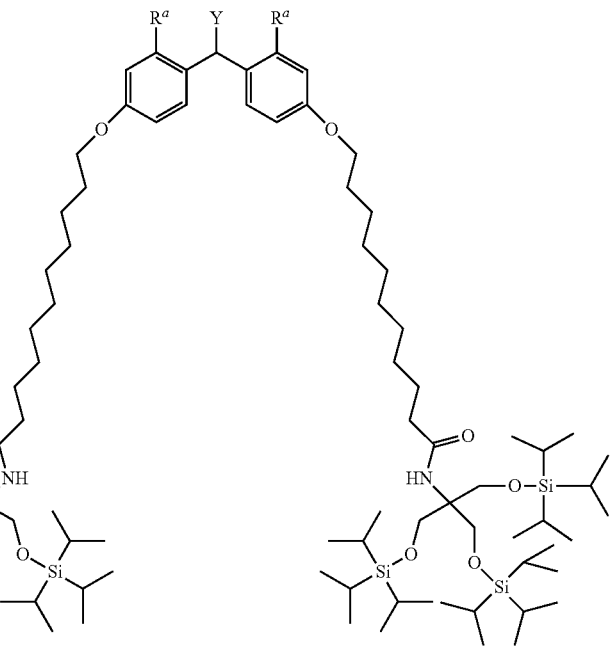
Herein, $R^a$ represents a hydrogen atom, a $C_{1-4}$ alkyl group, or a $C_{1-4}$ alkoxy group.
(d) TIPS6-Type-PP Protective Agent Herein, $R^a$ represents a hydrogen atom, a $C_{1-4}$ alkyl group, or a $C_{1-4}$ alkoxy group.

(e) TIPS9-Type-OPP Protective Agent

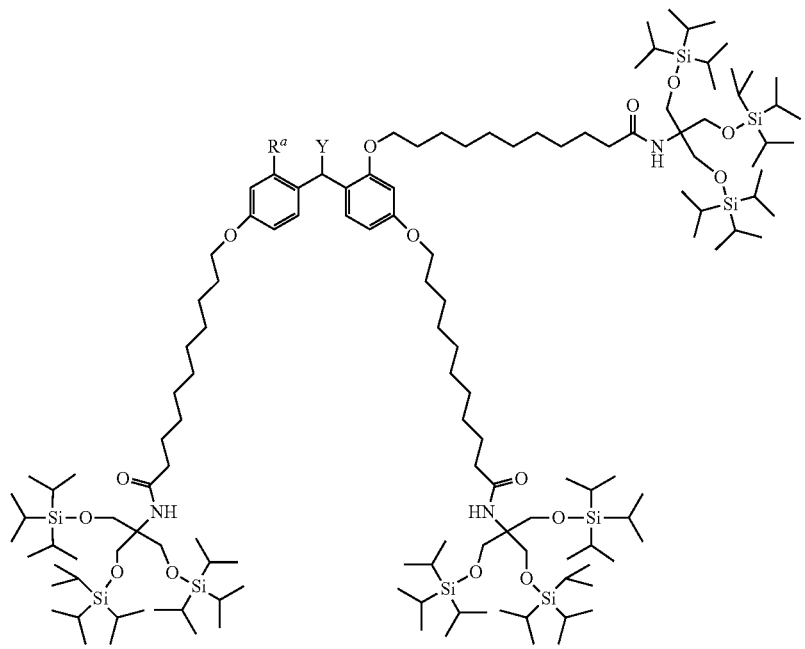

Herein, $R^a$ represents a hydrogen atom, a $C_{1-14}$ alkyl group, or a $C_{1-4}$ alkoxy group.

(e) TBDPS2-Type-PP Protective Agent

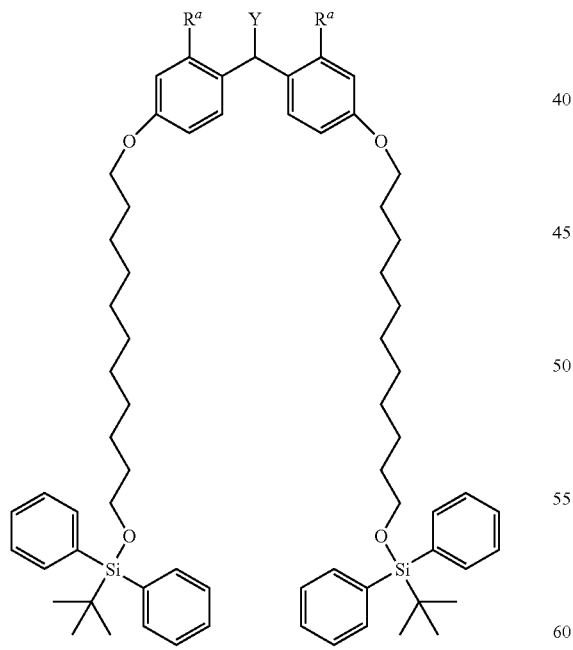

Herein, $R^a$ represents a hydrogen atom, a $C_{1-14}$ alkyl group, or a $C_{1-4}$ alkoxy group.

The diphenylmethane compound (1) of the present invention can be produced, for example, according to the following reaction scheme.

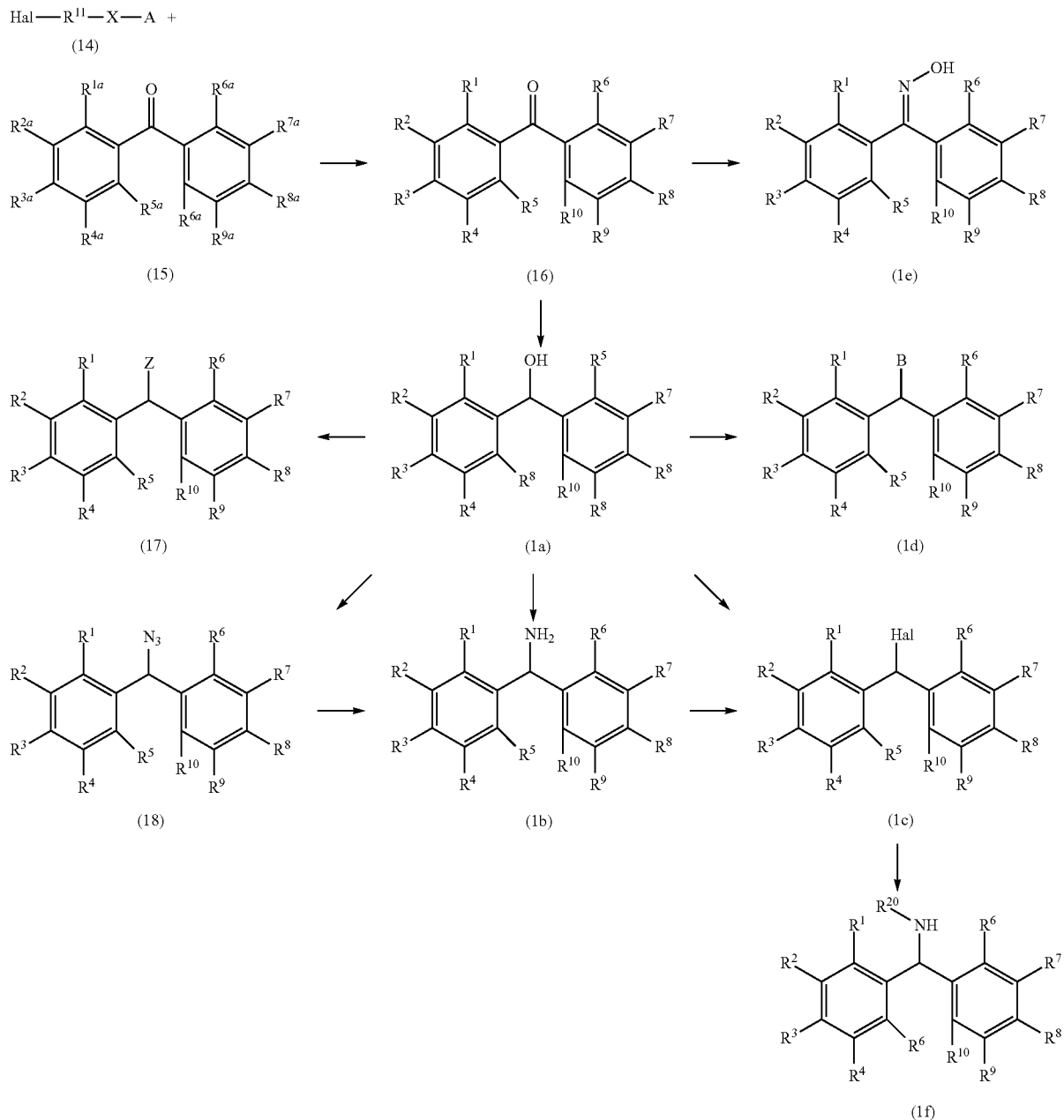

Herein, Hal represents a halogen atom, at least one of $R^{1a}$ to $R^{10a}$ represents a hydroxy group and the others each independently represent a hydrogen atom, a halogen atom, a $C_{1-4}$ alkyl group, or a $C_{1-4}$ alkoxy group, B represents an amino acid having a mercapto group or an amino acid derivative having a mercapto group, Z represents a compound having a —CONH-group, and $R^1$ to $R^{10}$, $R^{20}$, X, and A are the same as defined above.

A silyloxylated alkyl halide (14) is reacted with a diphenylketone (15) to give a silyloxy diphenylketone (16), subsequently the ketone group is converted to a hydroxy group followed by azidation to give an azide compound (18), and then the azido group is subjected to Staudinger reaction to afford a diphenylmethane compound (1b). A diphenylmethane compound (1a) having a hydroxy group is reacted with a compound having a —CONH$_2$ group to afford a compound (17). A diphenylmethane compound (1a) having a hydroxy group is halogenated to give a diphenylmethane compound (1c) having a halogen atom followed by reaction with an amine represented by $R^{20}$—NH$_2$ to afford a compound (1f). A diphenylmethane compound (1a) having a hydroxy group is reacted with an amino acid having a mercapto group or an amino acid derivative having a mercapto group to afford a compound (1d). A ketone compound (16) is oximated to afford an oxime compound (1e).

A silyloxylated alkyl halide (14) as a raw material can be produced by, for example, reacting a halogenated alcohol with a silylation agent in the presence of a base. Examples of the halogen atom in formula (14) include a bromine atom.

Examples of the silylation agent used in the above reaction include triisopropylsilyl chloride (TIPSCl), triisopropylsilyl bromide, triisopropylsilyl iodide, methanesulfonyl triisopropylsilyl, trifluoromethanesulfonyl isopropylsilyl, p-toluenesulfonyl triisopropylsilyl, tert-butylchlorodiphenylsilane (TBDPSCl), and tert-butyldimethylchlorosilane (TBSCl).

Examples of the base include organic bases such as TEA, DIPEA, DBU, diazabicyclononene (DBN), DABCO, imidazole, N-methyl imidazole, N,N-dimethyl aniline, pyridine, 2,6-lutidine, DMAP, LDA, NaOAc, MeONa, MeOK, lithium hexamethyldisilazide (LHMDS), and sodium bis(trimethylsilyl)amide (NaHMDS); and inorganic bases such as $Na_2CO_3$, $NaHCO_3$, NaH, $NaNH_2$, $K_2CO_3$, and $Cs_2CO_3$.

Examples of the solvent include hydrocarbons such as hexane and heptane; ethers such as diethyl ether, diisopropyl ether, cyclopentyl methyl ether (CPME), tetrahydrofuran, and dioxane; nitriles such as acetonitrile; amides such as dimethylformamide (DMF), dimethylacetamide, and hexamethylphosphoramide; sulfoxides such as dimethylsulfoxide; lactams such as N-methylpyrrolidone; halogenated hydrocarbons, such as chloroform and dichloromethane; and aromatic hydrocarbons such as toluene and xylene; or a mixed solvent thereof.

The reaction may be carried out, for example, at 0° C. to 100° C. for 1 to 24 hours.

The reaction between the silyloxylated alkyl halide (14) and the diphenylketones (15) is preferably carried out in the presence of a base.

Examples of the base used in the above reaction include organic bases such as TEA, DIPEA, DBU, DBN, DABCO, imidazole, N-methyl imidazole, N,N-dimethyl aniline, pyridine, 2,6-lutidine, DMAP, LDA, NaOAc, MeONa, MeOK, lithium hexamethyldisilazide (LHMDS), and sodium bis(trimethylsilyl)amide (NaHMDS); and inorganic bases such as $Na_2CO_3$, $NaHCO_3$, NaH, $K_2CO_3$, and $Cs_2CO_3$.

Examples of the solvent include hydrocarbons such as hexane and heptane; ethers such as diethyl ether, diisopropyl ether, CPME, tetrahydrofuran, and dioxane; nitriles such as acetonitrile; amides such as DMF, dimethylacetamide, and hexamethylphosphoramide; sulfoxides such as dimethylsulfoxide; lactams such as N-methylpyrrolidone; halogenated hydrocarbons, such as chloroform and dichloromethane; and aromatic hydrocarbons such as toluene and xylene; or a mixed solvent thereof.

The reaction may be carried out, for example, at 40° C. to 150° C. for 1 to 24 hours.

Examples of the method for converting a ketone group of the compound of formula (16) to a hydroxy group include a process comprising reduction using a reducing agent.

Examples of the reducing agent include lithium borohydride, sodium borohydride, aluminum lithium hydride, and aluminum hydride. Examples of the solvent include hydrocarbons such as hexane and heptane; alcohols such as methanol and ethanol; ethers such as diethyl ether, diisopropyl ether, CPME, tetrahydrofuran, and dioxane; and aromatic hydrocarbons such as toluene and xylene; or a mixed solvent thereof. The reaction is preferably carried out, for example, at 0° C. to 90° C. for 1 to 24 hours.

The method for azidation of the hydroxy group in formula (1a) is preferably a method comprising reacting with diphenylphosphoryl azide or bis(p-nitrophenyl)phosphoryl azide in the presence of a base.

Examples of the base include organic bases such as DBU, DBN, TEA, DIPEA, and DABCO. Examples of the solvent include hydrocarbons such as hexane and heptane; ethers such as diethyl ether, diisopropyl ether, CPME, tetrahydrofuran, and dioxane; and aromatic hydrocarbons such as toluene and xylene; or a mixed solvent thereof. The reaction may be carried out, for example, at 0° C. to 100° C. for 0.5 to 144 hours.

Examples of the method for reducing the azide compound (18) to the amine compound (1b) include Staudinger reaction comprising reacting with triphenylphosphine in the presence of water or a catalytic reduction. Inter alia, preferred is the Staudinger reaction.

Examples of the solvent for the Staudinger reaction include hydrocarbons such as hexane and heptane; ethers such as diethyl ether, diisopropyl ether, CPME, tetrahydrofuran, and dioxane; and aromatic hydrocarbons such as toluene and xylene; or a mixed solvent thereof. The reaction may be carried out, for example, at 20° C. to 100° C. for 1 to 24 hours.

The reaction between the compound of formula (1a) and the compound having a —$CONH_2$ group is preferably a method comprising reacting with the compound having a —$CONH_2$ group in the presence of an acid catalyst.

Examples of the compound having a —$CONH_2$ group or a —$OCONH_2$ group include Fmoc-$NH_2$, ethyl carbamate, isopropyl carbamate, $AcNH_2$, $HCONH_2$, Cbz-$NH_2$, $CF_3CONH_2$, and Fmoc-amino acid-$NH_2$. Examples of the acid catalyst include acids such as trifluoromethanesulfonic acid, methanesulfonic acid, p-toluene sulfonic acid, acetic acid, hydrochloric acid, and sulfuric acid. Examples of the solvent include hydrocarbons such as hexane and heptane; ethers such as diethyl ether, diisopropyl ether, CPME, tetrahydrofuran, and dioxane; aromatic hydrocarbons such as toluene and xylene; and halogenated hydrocarbons, such as chloroform and dichloromethane; or a mixed solvent thereof. The reaction may be carried out, for example, at 20° C. to 150° C. for 0.5 to 48 hours.

The compound of formula (1c) can be produced from the compound of formula (1a) by reacting with a halogenating agent in the presence of a base. Examples of the halogen atom in formula (1c) include a chlorine atom.

Examples of the halogenating agent include thionyl chloride, acetyl chloride, acetyl bromide, triphenylphosphine/carbon tetrachloride, and triphenylphosphine/carbon tetrachloride.

Examples of the base include organic bases such as pyridine, TEA, DBU, DBN, DIPEA, and DABCO.

Examples of the solvent include hydrocarbons such as hexane and heptane; ethers such as diethyl ether, diisopropyl ether, CPME, tetrahydrofuran, and dioxane; aromatic hydrocarbons such as toluene and xylene; halogenated hydrocarbons, such as chloroform and dichloromethane; and dimethylformamide (DMF); or a mixed solvent thereof. The reaction may be carried out, for example, at 0° C. to 100° C. for 0.5 to 24 hours.

The reaction between the compound of formula (1a) and the amino acid derivative having a mercapto group is preferably a method comprising reacting with an amino acid having a mercapto group or an amino acid derivative having a mercapto group in the presence of an acid catalyst.

Examples of the amino acid having a mercapto group include cysteine, homocysteine, mercaptonorvaline, and mercaptonorleucine. Examples of the amino acid derivative having a mercapto group include the above amino acids in which N terminals of the compounds are N-methylated; the above amino acids in which N terminals of the compounds are each protected with, for example, a benzyloxycarbonyl (Cbz or Z) group, a fluorenylmethoxycarbony (Fmoc) group, an acetyl (Ac) group, a benzyl group, an allyl group, an allyloxycarbonyl (Aloc) group, a 2-nitrobenzenesulfonyl (Ns) group, a 2,4-dinitrobenzenesulfonyl (DNs) group, and a 4-nitrobenzenesulfonyl (Nos) group; the above amino acids in which C terminals of the compounds are each protected with, for example, an amide group, a methyl ester group, an ethyl ester group, a tert-butyl ester group, a benzyl ester group, and an allyl ester group; the above amino acids in which both N terminals and C terminals are each protected with the above protecting groups; and D-amino acid compounds corresponding to the above compounds.

Examples of the acid catalyst include acids such as trifluoromethanesulfonic acid, methanesulfonic acid, p-toluene sulfonic acid, acetic acid, hydrochloric acid, and sulfuric acid. Examples of the solvent include hydrocarbons such as hexane and heptane; ethers such as diethyl ether, diisopropyl ether, CPME, tetrahydrofuran, and dioxane; aromatic hydrocarbons such as toluene and xylene; and halogenated hydrocarbons, such as chloroform and dichloromethane; or a mixed solvent thereof. The reaction may be carried out, for example, at 20° C. to 150° C. for 0.5 to 24 hours.

The compound of formula (1f) can be produced from the compound of formula (1c) by reacting with an amine represented by $R^{20}$—$NH_2$ in the presence of a base.

Examples of the base include tertiary amines such as diisopropyl amine and triethyl amine. Examples of the solvent include hydrocarbons such as hexane and heptane; ethers such as diethyl ether, diisopropyl ether, CPME, tetrahydrofuran, and dioxane; aromatic hydrocarbons such as toluene and xylene; and halogenated hydrocarbons, such as chloroform and dichloromethane; or a mixed solvent thereof. The reaction may be carried out, for example, at 0° C. to 100° C. for 0.5 to 24 hours.

The compound of formula (1e) can be produced from the compound of formula (16) by reacting the ketone group in formula (16) with an acid addition salt of a hydroxylamine in the presence of a base. Examples of the salt adduct of the hydroxylamine include a hydrochloride, a sulfates, an acetate, a trifluoroacetate, a methanesulfonate, a trifluoromethanesulfonate, and a p-toluenesulfonate.

Examples of the base include organic bases such as TEA, pyridine, DIPEA, N,N-dimethyl aniline, DBU, DBN, and DABCO; and inorganic bases such as sodium hydroxide, sodium hydrogencarbonate, potassium hydroxide, and potassium carbonate.

Examples of the solvent include hydrocarbons such as hexane and heptane; ethers such as diethyl ether, diisopropyl ether, cyclopentyl methyl ether (CPME), tetrahydrofuran, and dioxane; halogenated hydrocarbons, such as chloroform and dichloromethane; and aromatic hydrocarbons such as toluene, xylene; or a mixed solvent thereof. The reaction may be carried out, for example, at 20° C. to 120° C. for 1 to 96 hours.

The diphenylmethane compound (1) of the present invention can be used as a protective agent for a functional group such as a carboxy group, a hydroxy group, a diol group, an amino group, an amide group, or a mercapto group. A compound in which a carboxy group, a hydroxy group, a diol group, an amino group, an amide group, or a mercapto group is protected with the diphenylmethane compound (1) of the present invention is characterized by increased liquidity and solubility in a solvent. Thus, a compound in which a functional group is protected with the diphenylmethane compound (1) of the present invention as a protective agent becomes liquid, and can be separated and purified by an operation such as liquid-liquid phase separation. In addition, a protecting group obtained by using the inventive compound can be easily eliminated by an acid or catalytic reduction.

The compound, which can be protected, by the diphenylmethane compound (1) of the present invention may be a compound having a carboxy group, a hydroxy group, a diol group, an amino group, an amide group, or a mercapto group. Examples include amino acids, peptides, saccharides, proteins, nucleotides, various medicinal compounds and agrochemical compounds, various polymers and dendrimers, and others.

Examples of a method for synthesizing peptides using the diphenylmethane compound (1) of the present invention as a protective agent include a method of production comprising the following steps (1) to (4).

(1) The diphenylmethane compound (1) of the present invention is condensed with a C terminal carboxyl group of an N-protected amino acid or an N-protected peptide in a soluble solvent to give an N- and C-protected amino acid or an N- and C-protected peptide in which the C terminal is protected with the diphenylmethane compound (1) of the present invention. Alternatively, the diphenylmethane compound (1) of the present invention is reacted with a C terminal amide group of an N-protected amino acid or an N-protected peptide in a soluble solvent to give an N- and C-protected amino acid or an N- and C-protected peptide in which the C terminal is protected with the diphenylmethane compound (1) of the present invention.

(2) The protecting group of the N terminal of the resulting N- and C-protected amino acid or N- and C-protected peptide is removed to give a C-protected amino acid or C-protected peptide.

(3) An N-protected amino acid or an N-protected peptide is condensed with the N terminal of the resulting C-protected amino acid or C-protected peptide to give an N- and C-protected peptide.

(4) The protecting group of the N terminal and the protecting group of the C terminal of the resulting N- and C-protected peptide are removed to afford a desired peptide.

Examples

The present invention is described in more detail with reference to Examples below, but it should not be construed as being limited to the Examples in any way.

Example 1

Synthesis of TIPS2-Dpm-$NH_2$

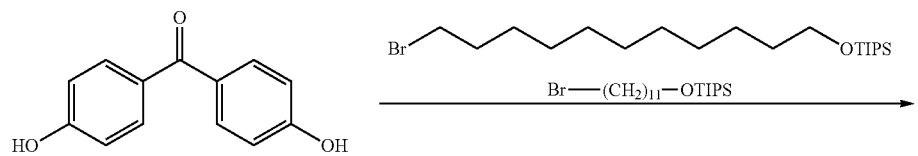

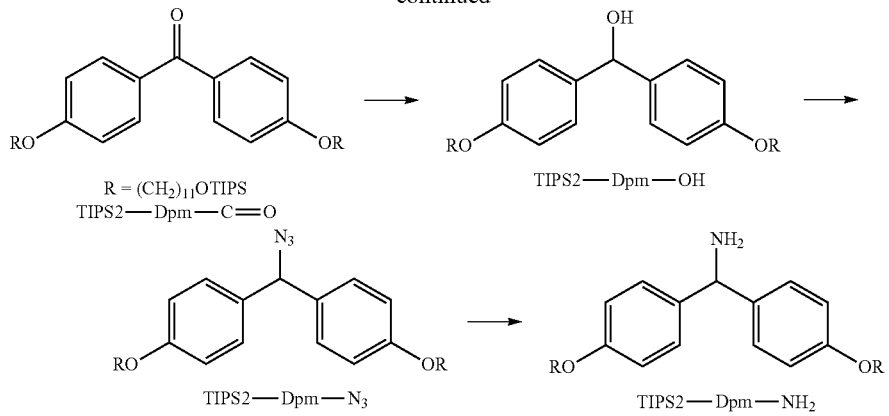

(Hereinafter, Br—(CH$_2$)$_{11}$-OTIPS, TIPS2-Dpm-C=O, TIPS2-Dpm-OH, TIPS2-Dpm-N$_3$, and TIPS2-Dpm-NH$_2$ represent the respective structures in the above scheme.)

(1) In 3.2 mL of DMF, 9.81 g of Br—(CH$_2$)$_{11}$-OTIPS (24.1 mmol), 2.29 g of 4,4'-dihydroxybenzophenone (10.7 mmol), and 5.33 g of potassium carbonate (38.5 mmol) were suspended, and the suspension was heated to 85° C. and stirred for 2 hours. The reaction solution was filtered, and the residue was washed with 150 mL of heptane. The filtrate was subjected to liquid-liquid extraction. To the resulting heptane layer was added 71 mL of heptane, and the solution was washed by liquid-liquid extraction with 71 mL of DMF. The washing step by liquid-liquid extraction with heptane and DMF was repeated once more. To the resulting heptane layer was added 71 mL of heptane, and the solution was washed by liquid-liquid extraction as follows: once with 71 mL of 1 N hydrochloric acid, once with 71 mL of 5% sodium hydrogencarbonate aqueous solution, and once with 71 mL of water. To the resulting heptane layer was added 71 mL of heptane, and the solution was washed by liquid-liquid extraction as follows: once with 71 mL of DMF and once with 71 mL of acetonitrile. The heptane layer was concentrated under reduced pressure to afford 10.7 g of TIPS2-Dpm-C=O.

$^1$H-NMR (400 MHz, CDCl$_3$) δ1.04-1.08 (m, 42H), 1.20-1.39 (m, 24H), 1.41-1.49 (m, 4H), 1.49-1.57 (m, 4H), 1.71-1.85 (m, 4H), 3.67 (t, 4H), 4.03 (t, 4H), 6.94 (d, 4H), 7.77 (d, 4H)

$^{13}$C-NMR (100 MHz, CDCl$_3$) δ12.2 (6C), 18.2 (12C), 26.0 (2C), 26.2 (2C), 29.2-29.8 (12C), 33.2 (2C), 63.7 (2C), 68.4 (2C), 114.0 (4C), 130.7 (2C), 132.4 (4C), 162.6 (2C), 194.6

ESIMS MNa+ 889.8

(2) In a mixed solution of 7.1 mL of THF (anhydrous) and 0.36 mL of methanol, 0.81 g of TIPS2-Dpm-C=O (0.93 mmol) was dissolved, and 42 mg of sodium borohydride (1.12 mmol) was added to the solution, followed by stirring for 1.5 hours. To the reaction solution was added 0.89 mL of 1 N hydrochloric acid to quench the reaction, 20.3 mL of CPME was added to the solution, and the solution was washed once with 6.1 mL of 1 N hydrochloric acid, once with 6.1 mL of 5% sodium hydrogencarbonate aqueous solution, and once with 6.1 mL of water. The organic layer was concentrated under reduced pressure. The resulting residue was dissolved in 20.0 mL of heptane, and the solution was washed by liquid-liquid extraction with 10.0 mL of DMF. To the resulting heptane layer was added 10.0 mL of heptane, and the solution was washed by liquid-liquid extraction with 10.0 mL of acetonitrile. The washing step by liquid-liquid extraction with heptane and acetonitrile was repeated once more, and the heptane layer was concentrated under reduced pressure to afford 0.81 g of TIPS2-Dpm-OH.

$^1$H-NMR (400 MHz, Benzene-d$_6$) δ1.12-1.16 (m, 42H), 1.23-1.54 (m, 32H), 1.57-1.71 (m, 4H), 1.79 (s, 1H), 3.68 (t, 8H), 5.61 (s, 1H), 6.84-6.89 (m, 4H), 7.27-7.33 (m, 4H)

$^{13}$C-NMR (100 MHz, Benzene-d$_6$) δ12.8 (6C), 18.7 (12C), 26.7 (2C), 26.8 (2C), 30.2-30.5 (12C), 33.9 (2C), 64.1 (2C), 68.3 (2C), 75.9, 114.9 (4C), 128.6 (4C), 137.8 (2C), 159.4 (2C)

(3) In 18.7 mL of THF, 0.81 g of TIPS2-Dpm-OH (0.93 mmol) was dissolved, and then 0.60 mL of diphenylphosphoryl azide (2.80 mmol) and 0.42 mL of DBU (2.80 mmol) were added to the solution, followed by stirring at room temperature for 4 days. The reaction solution was diluted with 54.2 mL of CPME, and the solution was washed by liquid-liquid extraction as follows: twice with 18.4 mL of 5% sodium hydrogencarbonate aqueous solution and four times with 18.4 mL of 20% sodium chloride aqueous solution. The organic layer was concentrated under reduced pressure. The residue was dissolved in 18.7 mL of heptane, and the solution was washed by liquid-liquid extraction with 9.3 mL of DMF. The washing step by liquid-liquid extraction with heptane and DMF was further repeated three times, and then the solution was washed once by liquid-liquid extraction with 9.3 mL of water. To the resulting heptane layer was added 10.7 mL of heptane, and the solution was washed by liquid-liquid extraction with 10.7 mL of acetonitrile. The washing step by liquid-liquid extraction with heptane and acetonitrile was repeated once more, and then the heptane layer was concentrated under reduced pressure to give 0.59 g of TIPS2-Dpm-N$_3$.

$^1$H-NMR (400 MHz, CDCl$_3$) δ1.04-1.08 (m, 42H), 1.20-1.39 (m, 24H), 1.41-1.49 (m, 4H), 1.49-1.57 (m, 4H), 1.71-1.81 (m, 4H), 3.67 (t, 4H), 3.94 (t, 4H), 5.62 (s, 1H), 6.86 (d, 4H), 7.19 (d, 4H)

$^{13}$C-NMR (100 MHz, CDCl$_3$) δ12.2 (6C), 18.2 (12C), 26.0 (2C), 26.2 (2C), 29.2-29.8 (12C), 33.2 (2C), 63.7 (2C), 67.9, 68.2 (2C), 114.7 (4C), 128.7 (4C), 131.9 (2C), 159.0 (2C)

(4) In 2.8 mL of THF, 0.38 g of TIPS2-Dpm-N$_3$ (0.43 mmol) was dissolved, and 0.34 g of triphenylphosphine (1.23 mmol) and 0.31 mL of water (17.0 mmol) were added to the solution, followed by stirring at 60° C. for 6 hours. Then, the residue was dissolved in 4.2 mL of heptane, and the solution was washed by liquid-liquid extraction with 4.2 mL of DMF. The washing step by liquid-liquid extraction with heptane and DMF was further repeated twice. Then, 4.2 mL of heptane was added to the heptane layer, and the solution was washed by liquid-liquid extraction with 4.2 mL of acetonitrile/water mixture(50/50). The washing step by liquid-liquid extraction with heptane and acetonitrile/water mixture(50/50) was repeated once more. To the resulting heptane layer was added 4.2 mL of heptane, and the solution was washed by liquid-liquid extraction with 4.2 mL of acetonitrile. The washing step by liquid-liquid extraction with heptane and acetonitrile was repeated once more, then the heptane layer was concentrated under reduced pressure, and the resulting residue was purified by silica gel chromatography (heptane:ethyl acetate=17:1 to ethyl acetate) to afford 0.30 g of TIPS2-Dpm-NH$_2$.

$^1$H-NMR (400 MHz, CDCl$_3$) δ1.04-1.08 (m, 42H), 1.20-1.39 (m, 24H), 1.41-1.49 (m, 4H), 1.49-1.57 (m, 4H), 1.71-1.81 (m, 4H), 1.98 (s, 2H), 3.67 (t, 4H), 3.91 (t, 4H), 5.12 (s, 1H)6.80-6.84 (m, 4H), 7.22-7.26 (m, 4H)

$^{13}$C-NMR (100 MHz, CDCl$_3$) δ12.2 (6C), 18.2 (12C), 26.0 (2C), 26.2 (2C), 29.5-29.8 (12C), 33.2 (2C), 58.6,63.7 (2C), 68.1 (2C), 114.5 (4C), 128.0 (4C), 137.9 (2C), 158.2 (2C)

Example 2

Synthesis of TIPS2-Dpm-Cl

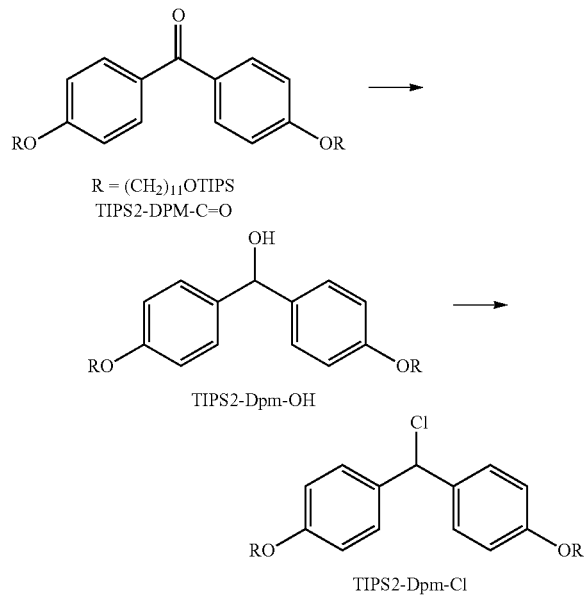

(Hereinafter, TIPS2-Dpm-Cl represents the structure in the above scheme.)

(1) In a mixed solution of 1.8 mL of THF (anhydrous) and 90 μl of methanol, 0.24 g of TIPS2-Dpm-C=O (0.24 mmol) was dissolved, and 11 mg of sodium borohydride (0.28 mmol) was added to the solution, followed by stirring for 3 hours. To the reaction solution was added 0.2 mL of 1 N hydrochloric acid to quench the reaction, 5.1 mL of CPME was added to the solution, and the solution was washed twice with 1.5 mL of 1 N hydrochloric acid and once with 1.5 mL of 20% sodium chloride aqueous solution. To the organic layer was added 0.20 g of anhydrous magnesium sulfate, and the mixture was stirred sufficiently, followed by filtration. The filtrate was concentrated under reduced pressure to give a mixture containing TIPS2-Dpm-OH.

(2) The mixture obtained in the foregoing step was dissolved in 3.7 mL of chloroform, and then 3.6 μL of DMF (0.05 mmol) and 98 μL of pyridine (1.22 mmol) were added to the solution, followed by cooling to 5° C. Then, 81 μL of thionyl chloride (1.11 mmol) was added to the solution, and the solution was heated to room temperature and stirred for 1 hour. To the reaction solution was added 12.2 mL of heptane, and the solution was washed by liquid-liquid extraction with 12.2 mL of acetonitrile. To the resulting heptane layer were added 2.0 mL of heptane and 0.6 mL of CPME, and the solution was washed by liquid-liquid extraction with 12.2 mL of acetonitrile. To the resulting heptane layer was added 2.0 mL of heptane, and the solution was washed by liquid-liquid extraction with 12.2 mL of acetonitrile. The washing step by liquid-liquid extraction with heptane and acetonitrile was repeated once more, and then the heptane layer was concentrated under reduced pressure to afford 81 mg of TIPS2-Dpm-Cl.

$^1$H-NMR (400 MHz, Benzene-d$_6$) δ1.12-1.16 (m, 42H), 1.23-1.38 (m, 28H), 1.39-1.48 (m, 4H), 1.56-1.66 (m, 4H), 3.63 (t, 4H), 3.68 (t, 4H), 6.02 (s, 1H), 6.76-6.82 (m, 4H), 7.27-7.32 (m, 4H)

$^{13}$C-NMR (100 MHz, Benzene-d$_6$) δ12.8 (6C), 18.7 (12C), 26.7 (2C), 26.8 (2C), 29.8-30.5 (12C), 33.9 (2C), 64.1 (2C), 65.1, 68.4 (2C), 115.0 (4C), 129.9 (4C), 134.4 (2C), 159.8 (2C)

Example 3

Synthesis of TIPS2-Dpm-OH(C$_8$)

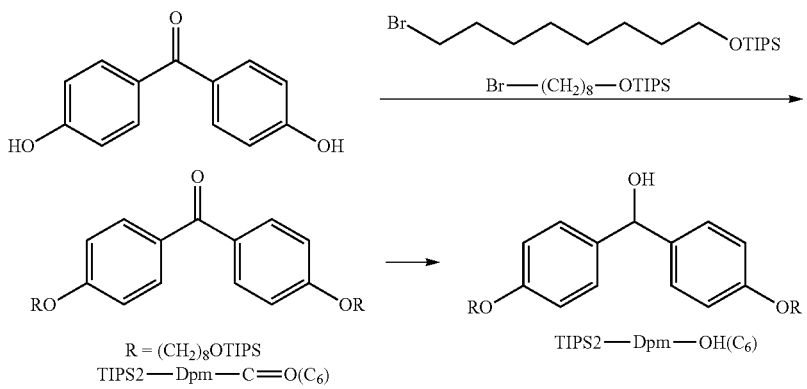

(Hereinafter, Br—$(CH_2)_8$-OTIPS, TIPS2-Dpm-C=O ($C_8$), and TIPS2-Dpm-OH($C_8$) represent the respective structures in the above scheme.)

(1) In 12.2 mL of DMF, 1.51 g of Br—$(CH_2)_8$-OTIPS (4.13 mmol), 0.39 g of 4,4'-dihydroxybenzophenone (1.83 mmol), and 0.91 g of potassium carbonate (6.60 mmol) were suspended, and the suspension was heated to 85° C. and stirred for 2 hours. The reaction solution was filtered, and the residue was washed with 25.7 mL of heptane. The filtrate was subjected to liquid-liquid extraction. To the resulting heptane layer was added 12.2 mL of heptane, and the solution was washed by liquid-liquid extraction with 12.2 mL of DMF. To the resulting heptane layer was added 12.2 mL of heptane, and the solution was washed by liquid-liquid extraction as follows: once with 12.2 mL of 1 N hydrochloric acid, once with 12.2 mL of 5% sodium hydrogencarbonate aqueous solution, and once with 12.2 mL of water. To the resulting heptane layer was added 12.2 mL of heptane, and the solution was washed by liquid-liquid extraction with 12.2 mL of acetonitrile twice. The heptane layer was concentrated under reduced pressure, and the resulting residue was purified by silica gel chromatography (heptane:ethyl acetate=80:1 to ethyl acetate) to give 1.11 g of TIPS2-Dpm-C=O($C_8$).

$^1$H-NMR (400 MHz, CDCl$_3$) δ1.04-1.08 (m, 42H), 1.33-1.43 (m, 12H), 1.43-1.64 (m, 8H), 1.82 (quin., 4H), 3.68 (t, 4H), 4.03 (t, 4H), 6.94 (d, 4H), 7.77 (d, 4H)

ESIMS MH+ 783.5

(2) In a mixed solution of 6.4 mL of THF (anhydrous) and 0.32 mL of methanol, 0.66 g of TIPS2-Dpm-C=O($C_8$) (0.85 mmol) was dissolved, and 38 mg of sodium borohydride (1.01 mmol) was added to the solution, followed by stirring at room temperature for 3 hours. To the reaction solution was added 0.80 mL of 1 N hydrochloric acid to quench the reaction, 16.6 mL of CPME was added to the solution, and the solution was washed twice with 5.0 mL of 1 N hydrochloric acid, once with 5.0 mL of 5% sodium hydrogencarbonate aqueous solution, and once with 5.0 mL of water. To the organic layer was added 0.66 g of anhydrous sodium sulfate, and the mixture was stirred sufficiently, followed by filtration. The residue was washed with 3.3 mL of heptane. The filtrate was concentrated under reduced pressure to afford 0.63 g of TIPS2-Dpm-OH($C_8$).

$^1$H-NMR (400 MHz, Benzene-d$_6$) δ1.11-1.16 (m, 42H), 1.22-1.31 (m, 12H), 1.31-1.43 (m, 4H), 1.52-1.66 (m, 9H), 3.66 (t, 8H), 5.59 (s, 1H), 6.83-6.89 (m, 4H), 7.26-7.32 (m, 4H)

ESIMS MNa+ 807.6

Example 4

Synthesis of TIPS2-Dpm-OH($C_{14}$)

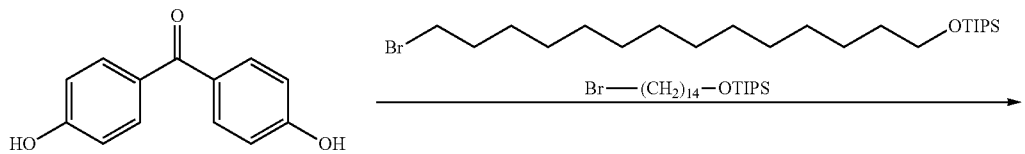

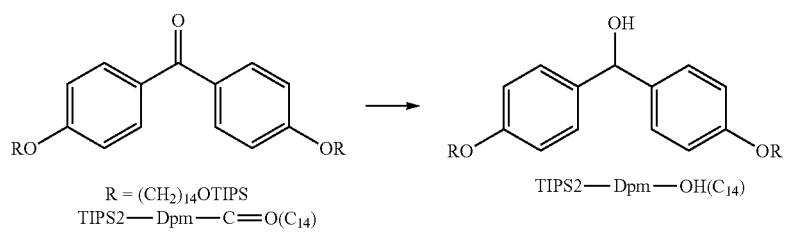

R = $(CH_2)_{14}$OTIPS
TIPS2—Dpm—C=O($C_{14}$)

TIPS2—Dpm—OH($C_{14}$)

(Hereinafter, Br—(CH$_2$)$_{14}$-OTIPS, TIPS2-Dpm-C=O (C$_{14}$), and TIPS2-Dpm-OH(C$_{14}$) represent the respective structures in the above scheme.)

(1) TIPS2-Dpm-C=O(C$_{14}$) was obtained by a similar manner to that described for TIPS2-Dpm-C=O(C$_8$) above.

$^1$H-NMR (400 MHz, CDCl$_3$) δ1.03-1.07 (m, 42H), 1.20-1.40 (m, 36H), 1.40-1.58 (m, 8H), 1.74-1.86 (m, 4H), 3.67 (t, 4H), 4.03 (t, 4H), 6.91-6.96 (m, 4H), 7.73-7.79 (m, 4H)

ESIMS MH+ 951.8

(2) TIPS2-Dpm-OH(C$_{14}$) was obtained by a similar manner to that described for TIPS2-Dpm-OH(C$_8$) above.

$^1$H-NMR (400 MHz, Benzene-d$_6$) δ1.12-1.16 (m, 42H), 1.23-1.40 (m, 36H), 1.40-1.49 (m, 4H), 1.55-1.69 (m, 9H), 3.68 (t, 8H), 5.60 (s, 1H), 6.85-6.90 (m, 4H), 7.28-7.33 (m, 4H)

ESIMS MNa+ 975.7

Example 5

Synthesis of TIPS2-Dpm-OH(C$_8$OC$_2$)

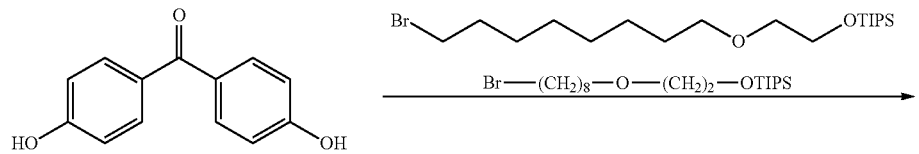

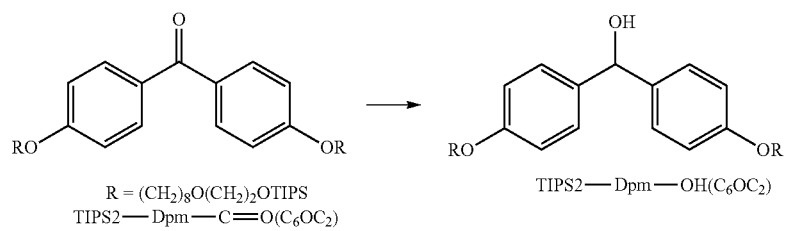

R = (CH$_2$)$_8$O(CH$_2$)$_2$OTIPS
TIPS2—Dpm—C=O(C$_6$OC$_2$)

TIPS2—Dpm—OH(C$_6$OC$_2$)

(Hereinafter, Br—(CH$_2$)$_8$—O—(CH$_2$)$_2$-OTIPS, TIPS2-Dpm-C=O(C$_8$OC$_2$), and TIPS2-Dpm-OH(C$_8$OC$_2$) represent the respective structures in the above scheme.)

(1) In 4.5 mL of DMF, 0.62 g of Br—(CH$_2$)$_8$—O—(CH$_2$)$_2$-OTIPS (1.50 mmol), 0.14 g of 4,4'-dihydroxybenzophenone (0.67 mmol), and 0.37 g of potassium carbonate (2.67 mmol) were suspended, and the suspension was heated to 85° C. and stirred for 2 hours 30 minutes. The reaction solution was filtered, and the residue was washed with 9.3 mL of heptane. The filtrate was subjected to liquid-liquid extraction. To the resulting heptane layer was added 4.5 mL of heptane, and the solution was washed by liquid-liquid extraction with 4.5 mL of DMF. To the resulting heptane layer was added 4.5 mL of heptane, and the solution was washed by liquid-liquid extraction as follows: once with 4.5 mL of 1 N hydrochloric acid, once with 4.5 mL of 5% sodium hydrogencarbonate aqueous solution, and once with 4.5 mL of water. To the resulting heptane layer was added 4.5 mL of heptane, and the solution was washed by liquid-liquid extraction with 4.5 mL of acetonitrile. The washing step by liquid-liquid extraction with heptane and acetonitrile was repeated once more. The heptane layer was concentrated under reduced pressure, and the resulting residue was purified by silica gel chromatography (heptane:ethyl acetate=40:1 to ethyl acetate) to give 0.14 g of TIPS2-Dpm-C=O(C$_8$OC$_2$).

$^1$H-NMR (400 MHz, CDCl$_3$) δ1.04-1.09 (m, 42H), 1.30-1.41 (m, 12H), 1.41-1.52 (m, 4H), 1.52-1.63 (m, 4H), 1.74-1.86 (m, 4H), 3.48 (t, 4H), 3.53 (t, 4H), 3.83 (t, 4H), 4.03 (t, 4H), 6.91-6.97 (m, 4H), 7.74-7.80 (m, 4H)

ESIMS MH+ 871.6

(2) TIPS2-Dpm-OH(C$_8$OC$_2$) was obtained by a similar manner to that described for TIPS2-Dpm-OH(C$_8$) above.

$^1$H-NMR (400 MHz, Benzene-d$_6$) δ1.1-1.15 (m, 42H), 1.20-1.28 (m, 8H), 1.28-1.40 (m, 8H), 1.53-1.69 (m, 9H), 3.38 (t, 4H), 3.49 (t, 4H), 3.67 (t, 4H), 3.83 (t, 4H), 5.60 (s, 1H), 6.85-6.90 (m, 4H), 7.27-7.33 (m, 4H)

ESIMS MNa+ 895.7

Example 6

Synthesis of TBDPS2-Dpm-OH

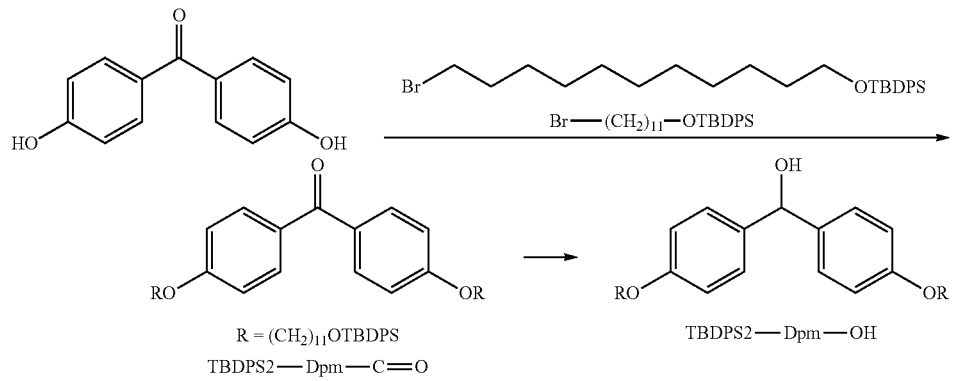

(Hereinafter Br—(CH$_2$)$_{11}$-OTBDPS, TBDPS2-Dpm-C=O, and TBDPS2-Dpm-OH represent the respective structures in the above scheme.)

(1) In 7.6 mL of DMF, 1.26 g of Br—(CH$_2$)$_{11}$-OTBDPS (2.56 mmol), 0.24 g of 4,4'-dihydroxybenzophenone (1.14 mmol), and 0.57 g of potassium carbonate (4.10 mmol) were suspended, and the suspension was heated to 85° C. and stirred for 3 hours. The reaction solution was filtered, and the residue was washed with 15.9 mL of heptane. The filtrate was subjected to liquid-liquid extraction. To the resulting heptane layer was added 7.6 mL of heptane, and the solution was washed by liquid-liquid extraction with 7.6 mL of acetonitrile. To the resulting heptane layer was added 7.6 mL of heptane, and the solution was washed by liquid-liquid extraction as follows: once with 7.6 mL of 1 N hydrochloric acid, once with 7.6 mL of 5% sodium hydrogencarbonate aqueous solution, and once with 7.6 mL of water. To the resulting heptane layer was added 7.6 mL of heptane, and the solution was washed by liquid-liquid extraction with 7.6 mL of acetonitrile twice. The heptane layer was concentrated under reduced pressure, and the resulting residue was purified by silica gel chromatography (heptane:ethyl acetate=80:1 to ethyl acetate) to afford 0.76 g of TBDPS2-Dpm-C=O.

$^1$H-NMR (400 MHz, CDCl$_3$) δ1.05 (s, 1H), 1.23-1.42 (m, 24H), 1.42-1.61 (m, 8H), 1.77-1.86 (m, 4H), 3.66 (t, 4H), 4.03 (t, 4H), 6.92-6.97 (m, 4H), 7.35-7.45 (m, 12H), 7.65-7.70 (m, 8H), 7.75-7.80 (m, 4H)

ESIMS MNa+ 1053.5

(2) TBDPS2-Dpm-OH was obtained by a similar manner to that described for TIPS2-Dpm-OH(C$_8$) above.

$^1$H-NMR (400 MHz, Benzene-d$_6$) δ1.20 (s, 18H), 1.22-1.32 (m, 24H), 1.32-1.43 (m, 4H), 1.56-1.68 (m, 9H), 3.68 (t, 4H), 3.71 (t, 4H), 5.59 (s, 1H), 6.86-6.90 (m, 4H), 7.22-7.27 (m, 12H), 7.28-7.33 (m, 4H), 7.79-7.84 (m, 8H)

ESIMS MNa+ 1055.6

Example 7

Synthesis of TIPS2-Dpm-OH(C$_{10}$—CONH—C$_2$)

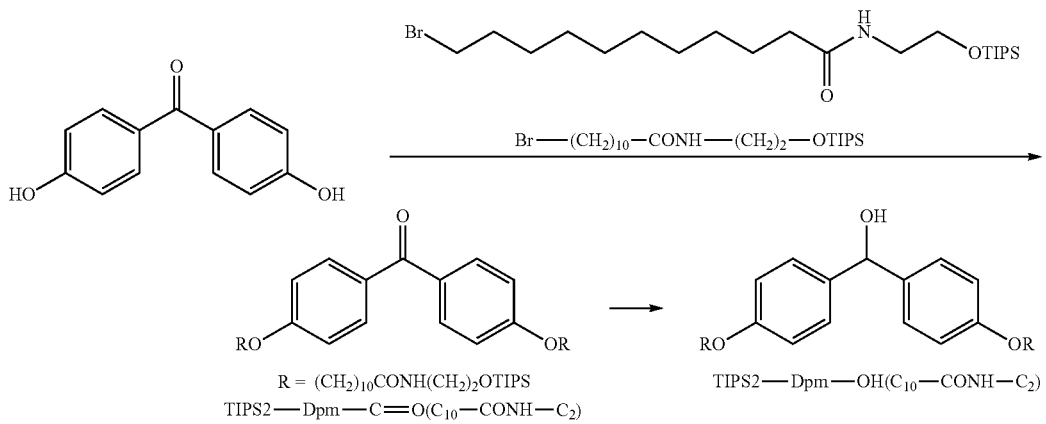

(Hereinafter, Br—(CH$_2$)$_{10}$—CONH—(CH$_2$)$_2$—OTIPS, TIPS2-Dpm-C=O(C$_{10}$—CONH—C$_2$), and TIPS2-Dpm-OH(C$_{10}$—CONH—C$_2$) represent the respective structures in the above scheme.)

(1) In 7.4 mL of DMF, 1.44 g of Br—(CH$_2$)$_{10}$—CONH—(CH$_2$)$_2$-OTIPS (3.11 mmol), 0.24 g of 4,4'-dihydroxybenzophenone (1.11 mmol), and 0.61 g of potassium carbonate (4.44 mmol) were suspended, and the suspension was heated to 115° C. and stirred for 2 hours 20 minutes. The reaction solution was filtered, and the residue was washed with 73.9 mL of heptane. The filtrate was concentrated under reduced pressure. To the resulting residue was added 22 mL of water, and the resulting precipitate was filtered. The precipitate was further washed with water, and the precipitate was filtered again. The resulting precipitate was washed with 22 mL of acetonitrile, and the precipitate was filtered. The precipitate was further washed with acetonitrile, and the precipitate was filtered again. The resulting precipitate was dried under reduced pressure to give 0.80 g of TIPS2-Dpm-C=O($C_{10}$—CONH—$C_2$).

$^1$H-NMR (400 MHz, CDCl$_3$) δ1.04-1.08 (m, 42H), 1.26-1.40 (m, 20H), 1.46 (quin., 4H), 1.62 (quin., 4H), 1.81 (quin., 4H), 2.18 (t, 4H), 3.40 (q, 4H), 3.76 (t, 4H), 4.02 (t, 4H), 5.88 (t, 2H), 6.91-6.96 (m, 4H), 7.74-7.79 (m, 4H)

ESIMS MH+ 981.7

(2) In a mixed solution of 2.0 mL of THF (anhydrous) and 0.10 mL of methanol, 0.26 g of TIPS2-Dpm-C=O($C_{10}$—CONH—$C_2$) (0.26 mmol) was dissolved, and 12 mg of sodium borohydride (0.32 mmol) was added to the solution, followed by stirring at room temperature for 3 hours 20 minutes. To the reaction solution was added 0.25 mL of 1 N hydrochloric acid to quench the reaction, 6.5 mL of CPME was added to the solution, and the solution was washed twice with 1.9 mL of 1 N hydrochloric acid, once with 1.9 mL of 5% sodium hydrogencarbonate aqueous solution, and once with 1.9 mL of water. To the organic layer was added 0.26 g of anhydrous sodium sulfate, and the mixture was stirred sufficiently, followed by filtration. The filtrate was concentrated under reduced pressure to afford 0.21 g of TIPS2-Dpm-OH($C_{10}$—CONH—$C_2$).

ESIMS MNa+ 1005.7

Example 8

Synthesis of TIPS4-Dpm-OH($C_{10}$—CONH—CH($CH_2$)$_2$)

OTIPS)$_2$ (0.52 mmol) was added to the suspension, and the suspension was stirred at 115° C. for 1 hour. The reaction solution was filtered, and the filtrate was washed with 18.3 mL of heptane. The filtrate was subjected to liquid-liquid extraction. To the resulting heptane layer was added 8.7 mL of heptane, and the solution was washed by liquid-liquid extraction with 8.7 mL of DMF. To the resulting heptane layer was added 8.7 mL of heptane, and the solution was washed by liquid-liquid extraction as follows: once with 8.7 mL of 1 N hydrochloric acid, once with 8.7 mL of 5% sodium hydrogencarbonate aqueous solution, and once with 8.7 mL of water. To the resulting heptane layer was added 8.7 mL of heptane, and the solution was washed by liquid-liquid extraction with 8.7 mL of acetonitrile. The washing step by liquid-liquid extraction with heptane and acetonitrile was repeated once more. The heptane layer was concentrated under reduced pressure to give 0.64 g of TIPS4-Dpm-C=O($C_{10}$—CONH—CH($CH_2$)$_2$).

$^1$H-NMR (400 MHz, CDCl$_3$) δ1.03-1.08 (m, 84H), 1.22-1.40 (m, 20H), 1.40-1.51 (m, 4H), 1.51-1.69 (m, 4H), 1.70-1.85 (m, 4H), 2.16 (t, 4H), 3.62-3.70 (m, 4H), 3.84-3.91 (m, 4H), 3.94-4.05 (m, 6H), 5.84 (d, 2H), 6.90-6.96 (m, 4H), 7.74-7.79 (m, 4H)

ESIMS MH+ 1353.9

(2) In a mixed solution of 2.9 mL of THF (anhydrous) and 0.15 mL of methanol, 0.52 g of TIPS4-Dpm-C=O($C_{10}$—CONH—CH($CH_2$)$_2$) (0.38 mmol) was dissolved, and 17 mg of sodium borohydride (0.46 mmol) was added to the solution, followed by stirring at room temperature for 3 hours 45 minutes. To the reaction solution was added 0.36 mL of 1 N hydrochloric acid to quench the reaction, 12.9 mL

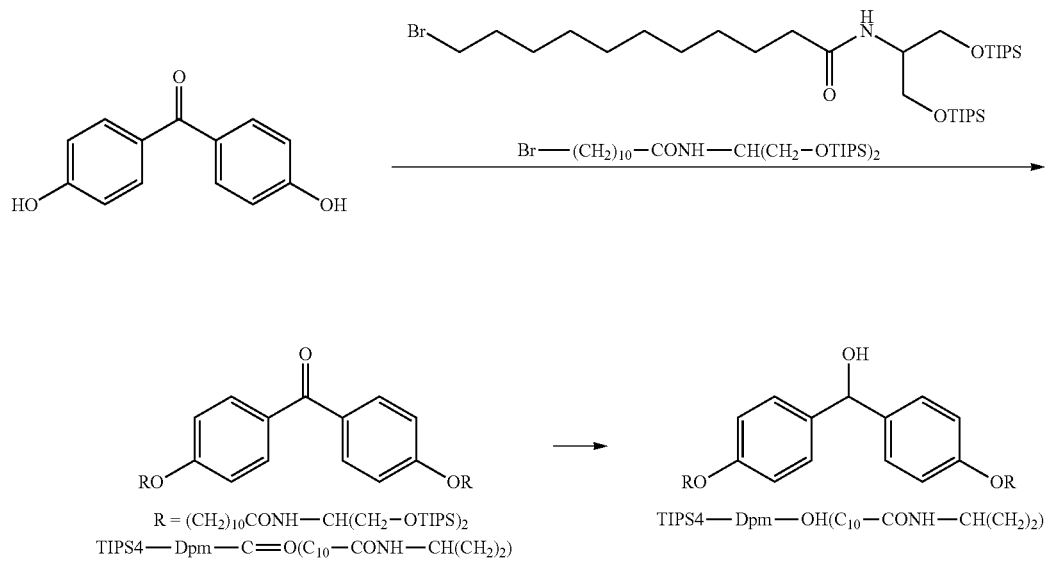

(Hereinafter, Br—($CH_2$)$_{10}$—CONH—CH($CH_2$—OTIPS)$_2$, TIPS4-Dpm-C=O($C_{10}$—CONH—CH($CH_2$)$_2$), and TIPS4-Dpm-OH($C_{10}$—CONH—CH($CH_2$)$_2$) represent the respective structures in the above scheme.)

(1) In 8.7 mL of DMF, 2.04 g of Br—($CH_2$)$_{10}$—CONH—CH($CH_2$—OTIPS)$_2$ (3.14 mmol), 0.28 g of 4,4'-dihydroxybenzophenone (1.31 mmol), and 0.69 g of potassium carbonate (4.97 mmol) were suspended, and the suspension was heated to 115° C. and stirred for 8 hours 30 minutes. In addition, 0.34 g of Br—($CH_2$)$_{10}$—CONH—CH($CH_2$- of ethyl acetate was added to the solution, and the solution was washed twice with 3.9 mL of 1 N hydrochloric acid, once with 3.9 mL of 5% sodium hydrogencarbonate aqueous solution, and once with 3.9 mL of water. To the organic layer was added 0.52 g of anhydrous sodium sulfate, and the mixture was stirred sufficiently, followed by filtration. The filtrate was concentrated under reduced pressure to afford 0.45 g of TIPS4-Dpm-OH($C_{10}$—CONH—CH($CH_2$)$_2$).

ESIMS MNa+ 1378.9

Example 9

Synthesis of TIPS4-Dpm-NH(CH$_2$)$_2$CH$_3$ (C$_{10}$—CONH—CH(CH$_2$)$_2$)

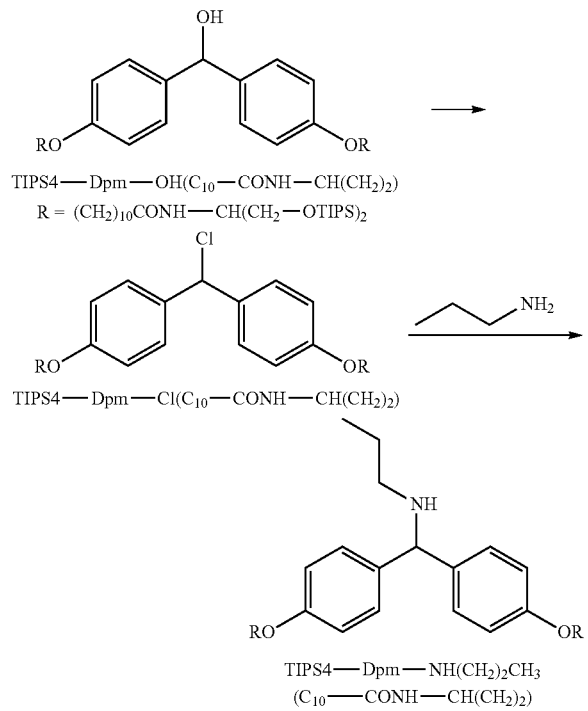

(Hereinafter, TIPS4-Dpm-Cl(C$_{10}$—CONH—CH(CH$_2$)$_2$) and TIPS4-Dpm-NH(CH$_2$)$_2$CH$_3$(C$_{10}$—CONH—CH(CH$_2$)$_2$) represent the respective structures in the above scheme.)

(1) In 5.3 mL of chloroform, 0.45 g of TIPS4-Dpm-OH (C$_{10}$—CONH—CH(CH$_2$)$_2$) (0.33 mmol) was dissolved, and then 5 µL of DMF (0.07 mmol) and 59 µL of pyridine (0.73 mmol) were added to the solution, followed by cooling to 5° C. Then, 48 µL of thionyl chloride (0.66 mmol) was added to the solution, and the solution was heated to room temperature and stirred for 1 hour 15 minutes. To the reaction solution were added 27.6 mL of heptane and 1.3 mL of CPME, and the solution was washed by liquid-liquid extraction with 26.7 mL of acetonitrile. To the resulting heptane layer were added 4.5 mL of heptane and 1.3 mL of CPME, and the solution was washed by liquid-liquid extraction with 26.7 mL of acetonitrile. To the resulting heptane layer was added 4.5 mL of heptane, and the solution was washed by liquid-liquid extraction with 26.7 mL of acetonitrile. The heptane layer was concentrated under reduced pressure to give a mixture containing TIPS4-Dpm-Cl(C$_{10}$—CONH—CH(CHA)$_2$).

(2) The mixture obtained in the foregoing step was dissolved in 2.5 mL of chloroform, and then 56 µL of propyl amine (0.67 mmol) and 0.12 mL of DIPEA (0.68 mmol) were added to the solution, followed by stirring at room temperature for 30 minutes. To the reaction solution was added 10.0 mL of CPME, and the solution was washed by liquid-liquid extraction as follows: twice with 6.0 mL of 0.5 N hydrochloric acid, once with 6.0 mL of 5% sodium hydrogencarbonate aqueous solution, and once with 6.0 mL of 20% sodium chloride aqueous solution. To the organic layer was added 0.90 g of anhydrous sodium sulfate, and the mixture was stirred sufficiently, followed by filtration. The filtrate was concentrated under reduced pressure to afford 0.25 g of TIPS4-Dpm-NH(CH$_2$)$_2$CH$_3$ (C$_{10}$—CONH—CH(CH$_2$)$_2$).

ESIMS MH+ 1396.9

Example 10

Synthesis of TIPS2-Dpm-NOH(C$_{14}$)

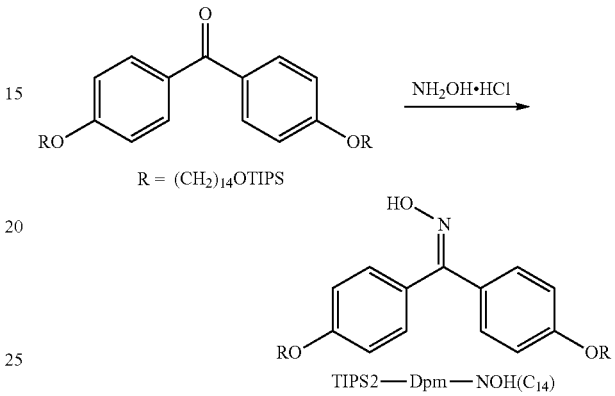

(Hereinafter, TIPS2-Dpm-NOH(C$_{14}$) represents the structure in the above scheme.)

(1) In 0.90 mL of CPME, 0.19 g of TIPS2-Dpm-C=O (C$_{14}$) (0.20 mmol) was dissolved, and then 41 mg of hydroxylamine hydrochloride (0.59 mmol) was added to the solution, followed by cooling to 5° C. To the solution was added 184 µL of pyridine (1.78 mmol), and the solution was heated to 90° C. and stirred for 22 hours 15 minutes. In addition, 41 mg of hydroxylamine hydrochloride (0.59 mmol) and 306 µL of pyridine (2.96 mmol) were added to the solution, and the solution was stirred at 90° C. for 7 hours 30 minutes. In addition, 124 mg of hydroxylamine hydrochloride (1.78 mmol) and 184 µL of pyridine (1.78 mmol) were added to the solution, and the solution was stirred at 90° C. for 2 hours. In addition, 247 mg of hydroxylamine hydrochloride (3.55 mmol) and 184 µL of pyridine (1.78 mmol) were added to the solution, and the solution was stirred at 90° C. for 15 hours. In addition, 247 mg of hydroxylamine hydrochloride (3.55 mmol) and 184 µL of pyridine (1.78 mmol) were added to the solution, and the solution was stirred at 90° C. for 6 hours 30 minutes. In addition, 247 mg of hydroxylamine hydrochloride (3.55 mmol), 367 µL of pyridine (3.56 mmol), and 1.0 mL of CPME were added to the solution, and the solution was stirred at 90° C. for 17 hours 15 minutes. The reaction solution was cooled to 5° C., and the reaction was quenched with 15 mL of 1 N hydrochloric acid. To the solution was added 25 mL of heptane, and the solution was washed by liquid-liquid extraction as follows: three times with 15 mL of 1 N hydrochloric acid, three times with 15 mL of 5% sodium hydrogencarbonate aqueous solution, and once with 15 mL of water. To the resulting heptane layer was added 15 mL of heptane, and the solution was washed by liquid-liquid extraction with 15 mL of acetonitrile. The washing step by liquid-liquid extraction with heptane and acetonitrile was repeated once more, and then the heptane layer was concentrated under reduced pressure to afford 0.14 g of TIPS2-Dpm-NOH(C$_{14}$).

ESIMS MH+ 966.9

Example 11

Synthesis of TIPS2-Dpm(OMe)₂-NH₂

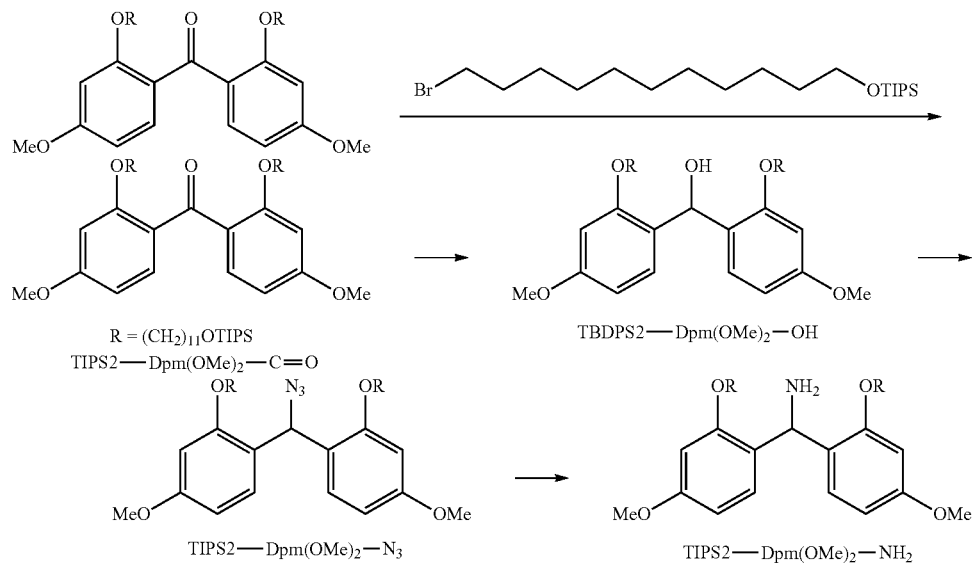

(Hereinafter, TIPS2-Dpm(OMe)₂-C=O, TIPS2-Dpm(OMe)₂-OH, TIPS2-Dpm(OMe)₂-N₃, and TIPS2-Dpm(OMe)₂-NH₂ represent the respective structures in the above scheme.)

(1) In 41 mL of DMF, 5.59 g of Br—(CH₂)₁₁-OTIPS (13.7 mmol), 1.67 g of 2,2'-dihydroxy-4,4'-dimethoxybenzophenone (6.09 mmol), and 3.03 g of potassium carbonate (22.9 mmol) were suspended, and the suspension was heated to 85° C. and stirred for 21 hours. The reaction solution was filtered, and the residue was washed with 85 mL of heptane. The filtrate was subjected to liquid-liquid extraction. To the resulting heptane layer was added 41 mL of heptane, and the solution was washed by liquid-liquid extraction with 41 mL of DMF. The washing step by liquid-liquid extraction with heptane and DMF was repeated once more. To the resulting heptane layer was added 41 mL of heptane, and the solution was washed by liquid-liquid extraction as follows: once with 41 mL of 1 N hydrochloric acid, once with 41 mL of 5% sodium hydrogencarbonate aqueous solution, and twice with 41 mL of water. To the resulting heptane layer was added 41 mL of heptane, and the solution was washed by liquid-liquid extraction as follows: once with 41 mL of DMF and twice with 41 mL of acetonitrile. The heptane layer was concentrated under reduced pressure, and the resulting residue was purified by silica gel column chromatography (heptane:ethyl acetate=45:1 to 20:1) to give 2.03 g of TIPS2-Dpm(OMe)₂-C=O (yield: 35.9%).

$^1$H-NMR (400 MHz, Benzene-d₆) δ1.12-1.16 (m, 42H), 1.23-1.38 (m, 28H), 1.41-1.51 (m, 4H), 1.57-1.67 (m, 4H), 3.38 (s, 6H), 3.51 (t, 4H), 3.70 (t, 4H), 6.33 (dd, 2H), 6.41 (d, 2H), 7.93 (d, 2H)

$^{13}$C-NMR (100 MHz, Benzene-d₆) δ12.8 (6C), 18.7 (12C), 26.7 (2C), 26.8 (2C), 29.9-30.6 (12C), 33.9 (2C), 55.3 (2C), 64.1 (2C), 68.6 (2C), 99.8 (2C), 104.7 (2C), 126.6 (2C), 132.8 (2C), 160.4 (2C), 163.9 (2C), 192.7

(2) In a mixed solution of 16.3 mL of THF (anhydrous) and 0.81 mL of methanol, 1.98 g of TIPS2-Dpm(OMe)₂-C=O (2.14 mmol) was dissolved, and 97 mg of sodium borohydride (2.56 mmol) was added to the solution, followed by stirring for 2 hours. To the reaction solution was added 2.0 mL of 1 N hydrochloric acid to quench the reaction, 50 mL of CPME was added to the solution, and the solution was washed once with 15 mL of 1 N hydrochloric acid, twice with 15 mL of water, once with 15 mL of 5% sodium hydrogencarbonate aqueous solution, and twice with 15 mL of water. The organic layer was concentrated under reduced pressure. The resulting residue was dissolved in 50 mL of heptane, and the solution was washed by liquid-liquid extraction with 25 mL of DMF. To the resulting heptane layer was added 25 mL of heptane, and the solution was washed by liquid-liquid extraction with 25 mL of acetonitrile. The washing step by liquid-liquid extraction with heptane and acetonitrile was repeated once more, and the heptane layer was concentrated under reduced pressure to give a mixture containing TIPS2-Dpm(OMe)₂-OH.

(3) The mixture obtained in the foregoing step was dissolved in 42.7 mL of THF, and then 2.34 g of bis(p-nitrophenyl)phosphoryl azide (6.41 mmol) and 0.96 mL of DBU (6.41 mmol) were added to the solution, followed by stirring at room temperature for 1 hour. The reaction solution was diluted with 124 mL of CPME, and the solution was washed by liquid-liquid extraction with 42 mL of 5% sodium hydrogencarbonate aqueous solution six times. The solution was concentrated under reduced pressure. The residue was dissolved in 128 mL of heptane, and the solution was washed by liquid-liquid extraction with 43 mL of DMF. The washing step by liquid-liquid extraction with heptane and DMF was further repeated twice, and then the solution was washed by liquid-liquid extraction with 43 mL of acetonitrile twice. The resulting heptane layer was concentrated under reduced pressure, and the residue was purified by silica gel column chromatography (heptane:ethyl acetate=35:1) to give 0.74 g of TIPS2-Dpm(OMe)₂-N₃ ((yield: 36.2%, 2 steps).

$^1$H-NMR (400 MHz, Benzene-d₆) δ1.12-1.16 (m, 42H), 1.23-1.38 (m, 28H), 1.41-1.51 (m, 4H), 1.57-1.67 (m, 4H), 3.37 (s, 6H), 3.61-3.73 (m, 8H), 6.35 (dd, 2H), 6.53 (d, 2H), 6.78 (s, 1H), 7.40 (d, 2H)

$^{13}$C-NMR (100 MHz, Benzene-d₆) δ12.8 (6C), 18.7 (12C), 26.7 (2C), 26.8 (2C), 29.8-30.6 (12C), 33.9 (2C), 55.2 (2C), 58.0, 64.1 (2C), 68.4 (2C), 100.1 (2C), 104.3 (2C), 121.8 (2C), 129.8 (2C), 158.2 (2C), 161.4 (2C)

(4) In 4.9 mL of THF, 0.70 g of TIPS2-Dpm(OMe)$_2$-N$_3$ (0.73 mmol) was dissolved, and 0.57 g of triphenylphosphine (2.18 mmol) and 0.53 mL of water (29.1 mmol) were added to the solution, followed by stirring at 60° C. for 6 hours. The reaction solution was concentrated under reduced pressure. Then, the residue was dissolved in 14.6 mL of heptane, and the solution was washed by liquid-liquid extraction with 7.3 mL of DMF. The washing step by liquid-liquid extraction with heptane and DMF was further repeated twice. Then, 7.3 mL of heptane was added to the heptane layer, and the solution was washed by liquid-liquid extraction with 7.3 mL of acetonitrile/water mixture (50/50). The washing step by liquid-liquid extraction with heptane and acetonitrile/water mixture (50/50) was repeated once more. To the resulting heptane layer was added 7.3 mL of heptane, and the solution was washed by liquid-liquid extraction with 7.3 mL of acetonitrile. The washing step by liquid-liquid extraction with heptane and acetonitrile was repeated once more, then the heptane layer was concentrated under reduced pressure, and the resulting residue was purified by silica gel chromatography (heptane:ethyl acetate=13:1 to ethyl acetate) to afford 0.34 g of TIPS2-Dpm(OMe)$_2$-NH$_2$ (yield: 50.3%).

$^1$H-NMR (400 MHz, Benzene-d$_6$) δ1.12-1.16 (m, 42H), 1.23-1.38 (m, 28H), 1.41-1.51 (m, 4H), 1.57-1.67 (m, 4H), 1.71 (s, 2H), 3.44 (s, 6H), 3.63-3.73 (m, 8H), 6.02 (s, 1H), 6.44 (dd, 2H), 6.58 (d, 2H), 7.49 (d, 2H)

$^{13}$C-NMR (100 MHz, Benzene-d$_6$) δ12.8 (6C), 18.7 (12C), 26.8 (4C), 29.8-30.6 (12C), 33.9 (2C), 48.9, 55.3 (2C), 64.1 (2C), 68.2 (2C), 100.2 (2C), 104.1 (2C), 128.3 (2C), 129.1 (2C), 158.2 (2C), 160.5 (2C)

Example 12

Synthesis of TIPS3-Dpm-NH$_2$ (4.52 mmol), and 3.12 g of potassium carbonate (22.59 mmol) were suspended, and the suspension was heated to 85° C. and stirred for 15.5 hours. The reaction solution was filtered, and the residue was washed with 63 mL of heptane. The filtrate was subjected to liquid-liquid extraction. To the resulting heptane layer was added 30 mL of heptane, and the solution was washed by liquid-liquid extraction with 30 mL of DMF. The washing step by liquid-liquid extraction with heptane and DMF was repeated once more. To the resulting heptane layer was added 30 mL of heptane, and the solution was washed by liquid-liquid extraction as follows: once with 30 mL of 1 N hydrochloric acid, once with 30 mL of 5% sodium hydrogencarbonate aqueous solution, and twice with 30 mL of water. To the resulting heptane layer was added 30 mL of heptane, and the solution was washed by liquid-liquid extraction as follows: once with 30 mL of DMF and twice with 30 mL of acetonitrile. The resulting heptane layer was concentrated under reduced pressure to give 5.96 g of TIPS3-Dpm-C=O.

$^1$H-NMR (400 MHz, CDCl$_3$) δ1.04-1.08 (m, 63H), 1.20-1.57 (m, 50H), 1.74-1.84 (m, 4H), 3.64-3.69 (m, 6H), 3.83 (t, 2H), 3.99 (t, 4H), 6.45 (d, 1H), 6.52 (dd, 1H), 6.83-6.87 (m, 2H), 7.36 (d, 1H), 7.70-7.76 (m, 2H)

$^{13}$C-NMR (100 MHz, CDCl$_3$) δ 12.2 (9C), 18.2 (18C), 25.9, 26.10 (3C), 26.2 (2C), 29.1-29.8 (18C), 33.2 (3C), 63.7 (3C), 68.3, 68.4, 68.5, 99.9, 105.3, 113.8 (2C), 122.4, 131.7, 132.0 (3C), 158.8, 162.7, 162.8, 195.0

(2) In a mixed solution of 5.8 mL of THF (anhydrous) and 0.29 mL of methanol, 0.92 g of TIPS3-Dpm-C=O (0.76 mmol) was dissolved, and 34 mg of sodium borohydride (0.91 mmol) was added to the solution, followed by stirring for 3 hours. To the reaction solution was added 0.72 mL of 1 N hydrochloric acid to quench the reaction, 23.0 mL of CPME was added to the solution, and the solution was washed once with 6.9 mL of 1 N hydrochloric acid, once with 6.9 mL of 5% sodium hydrogencarbonate aqueous

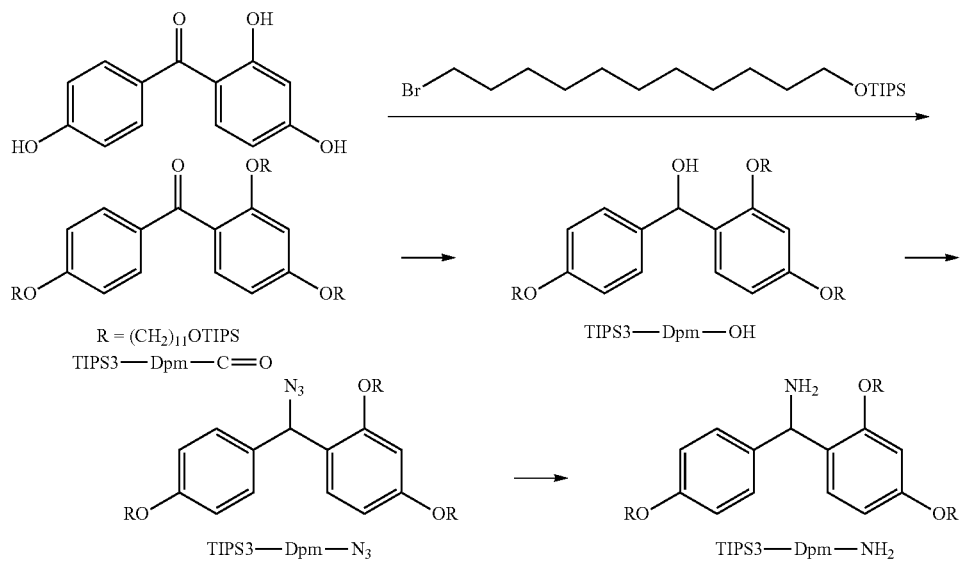

(Hereinafter, TIPS3-Dpm-C=O, TIPS3-Dpm-OH, TIPS3-Dpm-N$_3$, and TIPS3-Dpm-NH$_2$ represent the respective structures in the above scheme.)

(1) In 30 mL of DMF, 6.35 g of Br—(CH$_2$)$_{11}$-OTIPS (15.59 mmol), 1.04 g of 2,4,4'-trihydroxybenzophenone solution, and once with 6.9 mL of water. The organic layer was concentrated under reduced pressure. The resulting residue was dissolved in 23.0 mL of heptane, and the solution was washed by liquid-liquid extraction with 11.0 mL of DMF. To the resulting heptane layer was added 11.0 mL of heptane, and the solution was washed by liquid-liquid extraction with 11.0 mL of acetonitrile. The washing step by liquid-liquid extraction with heptane and acetonitrile was repeated once more, and then the heptane layer was concentrated under reduced pressure to give a mixture containing TIPS3-Dpm-OH.

(3) The mixture obtained in the foregoing step was dissolved in 15.2 mL of THF, and then 0.83 g of bis(p-nitrophenyl)phosphoryl azide (2.28 mmol) and 0.34 mL of DBU (2.28 mmol) were added to the solution, followed by stirring at room temperature for 1 hour. The reaction solution was diluted with 44.1 mL of CPME, and the solution was washed by liquid-liquid extraction with 15.0 mL of 5% sodium hydrogencarbonate aqueous solution twice. The resulting organic layer was concentrated under reduced pressure. The residue was dissolved in 30.0 mL of heptane, and the solution was washed by liquid-liquid extraction as follows: once with 15.0 mL of acetonitrile and twice with 7.6 mL of water. To the resulting heptane layer was added 15.2 mL of heptane, and the solution was washed by liquid-liquid extraction with 7.6 mL of DMF. The washing step by liquid-liquid extraction with heptane and DMF was further repeated three times, then the solution was washed by liquid-liquid extraction with 7.6 mL of acetonitrile three times, and the heptane layer was concentrated under reduced pressure to give 0.63 g of TIPS3-Dpm-N$_3$.

$^1$H-NMR (400 MHz, Benzene-d$_6$) δ1.12-1.16 (m, 63H), 1.20-1.51 (m, 50H), 1.59-1.66 (m, 4H), 3.64-3.75 (m, 12H), 6.25 (s, 1H), 6.45 (dd, 1H), 6.57 (d, 1H), 6.84-6.88 (m, 2H), 7.33-7.37 (m, 2H) 7.39 (d, 1H)

$^{13}$C-NMR (100 MHz, Benzene-d$_6$) δ12.8 (9C), 18.7 (18C), 26.7 (3C), 26.8 (2C), 26.9, 29.8-30.5 (18C), 33.9 (3C), 63.2, 64.1 (3C), 68.3, 68.4, 68.5, 100.7, 105.3, 115.0 (2C), 121.8, 129.5 (2C), 129.8, 132.8, 158.1, 159.6, 161.2

(4) In 2.9 mL of THF, 0.53 g of TIPS3-Dpm-N$_3$ (0.43 mmol) was dissolved, and 0.34 g of triphenylphosphine (1.28 mmol) and 0.31 mL of water (17.1 mmol) were added, followed by stirring at 60° C. for 6 hours. The reaction solution was concentrated under reduced pressure. The residue was dissolved in 8.6 mL of heptane, and the solution was washed by liquid-liquid extraction with 4.3 mL of DMF. The washing step by liquid-liquid extraction with heptane and DMF was further repeated twice. Then, 4.3 mL of heptane was added to the heptane layer, and the solution was washed by liquid-liquid extraction with 4.3 mL of acetonitrile/water mixture (50/50). The washing step by liquid-liquid extraction with heptane and acetonitrile/water mixture (50/50) was repeated once more. To the resulting heptane layer was added 4.3 mL of heptane, and the solution was washed by liquid-liquid extraction with 4.3 mL of acetonitrile. The washing step by liquid-liquid extraction with heptane and acetonitrile was repeated once more, then the heptane layer was concentrated under reduced pressure, and the resulting residue was purified by silica gel chromatography (heptane:ethyl acetate=17:1 to ethyl acetate) to afford 0.25 g of TIPS3-Dpm-NH$_2$.

$^1$H-NMR (400 MHz, Benzene-d$_6$) δ1.12-1.16 (m, 63H), 1.20-1.51 (m, 50H), 1.58-1.68 (m, 6H), 3.56-3.75 (m, 10H), 3.80 (t, 2H), 5.60 (s, 1H), 6.53 (dd, 1H), 6.60 (d, 1H), 6.92-6.98 (m, 2H), 7.53 (d, 1H), 7.54-7.59 (m, 2H)

$^{13}$C-NMR (100 MHz, Benzene-d$_6$) δ12.8 (9C), 18.7 (18C), 26.7 (2C), 26.8 (2C), 26.9 (2C), 29.6-30.5 (18C), 33.9 (3C), 54.0, 64.1 (3C), 68.2, 68.3, 68.4, 100.8, 105.1, 114.8 (2C), 128.3, 128.9, 129.1 (2C), 138.9, 158.0, 158.9, 160.2

Example 13

Synthesis of TIPS6-Dpm-NH$_2$

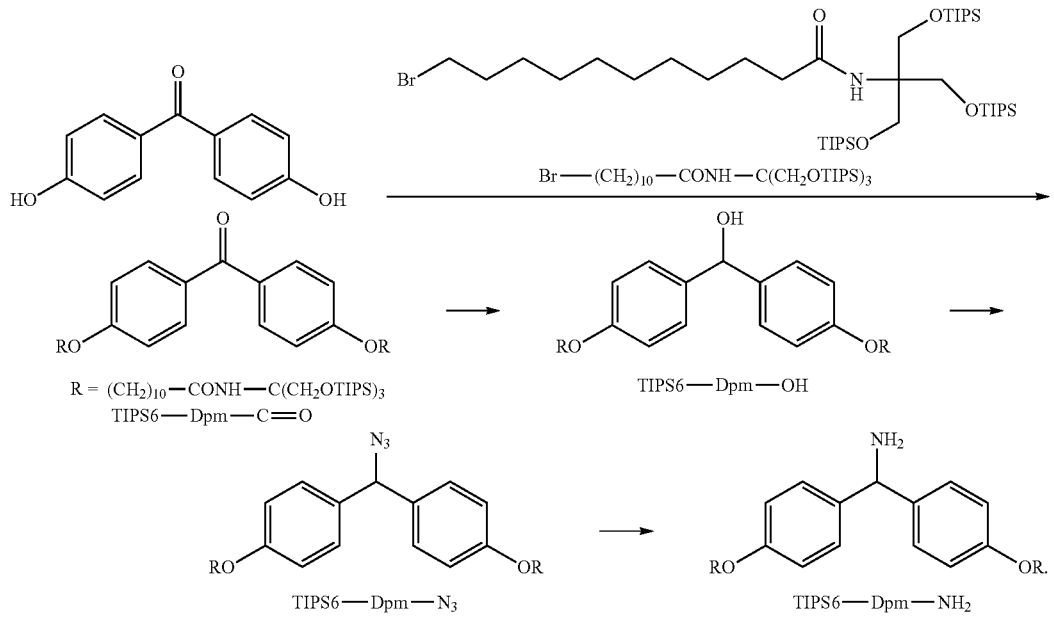

(Hereinafter, Br—(CH$_2$)$_{10}$—CONH—C(CH$_2$OTIPS)$_3$, TIPS6-Dpm-C=O, TIPS6-Dpm-OH, TIPS6-Dpm-N$_3$, and TIPS6-Dpm-NH$_2$ represent the respective structures in the above scheme.)

(1) In 42 mL of DMF, 13.11 g of Br—(CH$_2$)$_{10}$—CONH—C(CH$_2$OTIPS)$_3$ (15.66 mmol), 1.36 g of 4,4'-dihydroxybenzophenone (6.34 mmol), and 2.93 g of potassium carbonate (21.17 mmol) were suspended, the suspension was heated to 110° C. and stirred for 3 hours, and then heated to 120° C. and stirred for 1 hour. The reaction solution was filtered, and the residue was washed with 89 mL of heptane. The filtrate was subjected to liquid-liquid extraction. To the resulting heptane layer was added 42 mL of heptane, and the solution was washed by liquid-liquid extraction with 42 mL of DMF. The washing step by liquid-liquid extraction with heptane and DMF was repeated once more. To the resulting heptane layer was added 42 mL of heptane, and the solution was washed by liquid-liquid extraction as follows: once with 42 mL of 1 N hydrochloric acid, once with 42 mL of 5% sodium hydrogencarbonate aqueous solution, and twice with 42 mL of water. To the resulting heptane layer was added 85 mL of heptane, and the solution was washed by liquid-liquid extraction as follows: once with 42 mL of DMF and twice with 42 mL of acetonitrile. The heptane layer was concentrated under reduced pressure. The resulting residue was purified by silica gel column chromatography (heptane:ethyl acetate=25:1 to 15:1) to give 5.36 g of TIPS6-Dpm-C=O (yield: 49.0%).

$^1$H-NMR (400 MHz, Benzene-d$_6$) δ1.15-1.20 (m, 126H), 1.23-1.38 (m, 24H), 1.56-1.65 (m, 4H), 1.71-1.82 (m, 4H), 2.20 (t, 4H), 3.61 (t, 4H), 4.43 (s, 12H), 5.90 (s, 2H), 6.77-6.81 (m, 4H), 7.89-7.95 (m, 4H)

$^{13}$C-NMR (100 MHz, Benzene-d$_6$) δ12.7 (18C), 18.7 (36C), 26.6 (2C), 26.7 (2C), 29.8-30.3 (12C), 38.2 (2C), 62.3 (6C), 62.8 (2C), 68.5 (2C), 114.6 (4C), 131.9 (2C), 132.9 (4C), 163.0 (2C), 172.3 (2C), 193.8

(2) In a mixed solution of 22.9 mL of THF (anhydrous) and 1.15 mL of methanol, 5.19 g of TIPS6-Dpm-C=O (3.01 mmol) was dissolved, and 0.14 g of sodium borohydride (3.61 mmol) was added to the solution, followed by stirring for 2 hours. To the reaction solution was added 2.9 mL of 1 N hydrochloric acid to quench the reaction, 130 mL of CPME was added to the solution, and the solution was washed once with 39 mL of 1 N hydrochloric acid and three times with 39 mL of water. The organic layer was concentrated under reduced pressure. The resulting residue was dissolved in 130 mL of heptane, and the solution was washed by liquid-liquid extraction with 65 mL of DMF. To the resulting heptane layer was added 65 mL of heptane, and the solution was washed by liquid-liquid extraction with 65 mL of acetonitrile. The washing step by liquid-liquid extraction with heptane and acetonitrile was repeated once more, and then the heptane layer was concentrated under reduced pressure to give a mixture containing TIPS6-Dpm-OH.

(3) The mixture obtained in the foregoing step was dissolved in 60 mL of THF, and 3.29 g of bis(p-nitrophenyl) phosphoryl azide (9.02 mmol) and 1.35 mL of DBU (9.02 mmol) were added to the solution, followed by stirring at room temperature for 1 hour. The reaction solution was diluted with 174 mL of CPME, and the solution was washed by liquid-liquid extraction as follows: once with 59 mL of 5% sodium hydrogencarbonate aqueous solution and six times with 500 mL of water. The solution was concentrated under reduced pressure. The residue was dissolved in 120 mL of heptane, and the solution was washed by liquid-liquid extraction with 60 mL of DMF. The washing step by liquid-liquid extraction with heptane and DMF was repeated once more. To the resulting heptane layer was added 60 mL of heptane, and the solution was washed by liquid-liquid extraction with 60 mL of acetonitrile. The washing step by liquid-liquid extraction with heptane and acetonitrile was repeated once more, and then the heptane layer was concentrated under reduced pressure. The resulting residue was purified by silica gel column chromatography (heptane:ethyl acetate=40:1 to 20:1) to give 1.36 g of TIPS6-Dpm-N$_3$ (yield: 31.0%, 2 steps).

$^1$H-NMR (400 MHz, Benzene-d$_6$) δ1.15-1.20 (m, 126H), 1.23-1.38 (m, 24H), 1.58-1.67 (m, 4H), 1.70-1.79 (m, 4H), 2.19 (t, 4H), 3.64 (t, 4H), 4.42 (s, 12H), 5.36 (s, 1H), 5.89 (s, 2H), 6.80-6.85 (m, 4H), 7.13-7.18 (m, 4H)

$^{13}$C-NMR (100 MHz, Benzene-d$_6$) δ12.7 (18C), 13.7 (36C), 26.6 (2C), 26.8 (2C), 29.8-30.3 (12C), 38.2 (2C), 62.3 (6C), 62.8 (2C), 68.3 (2C), 68.4, 115.2 (4C), 129.4 (4C), 132.8 (2C), 159.8 (2C), 172.3 (2C)

(4) In 4.72 mL of THF, 1.24 g of TIPS6-Dpm-N$_3$ (0.71 mmol) was dissolved, and 0.56 g of triphenylphosphine (2.13 mmol) and 0.51 mL of water (28.33 mmol) were added to the solution, followed by stirring at 60° C. for 6 hours. The reaction solution was concentrated under reduced pressure. The residue was dissolved in 14.2 mL of heptane, and the solution was washed by liquid-liquid extraction with 7.1 mL of DMF. The washing step by liquid-liquid extraction with heptane and DMF was further repeated twice. Then, 7.1 mL of heptane was added to the heptane layer, and the solution was washed by liquid-liquid extraction with 7.1 mL of acetonitrile/water mixture (50/50). The washing step by liquid-liquid extraction with heptane and acetonitrile/water mixture (50/50) was repeated once more. To the resulting heptane layer was added 7.1 mL of heptane, and the solution was washed by liquid-liquid extraction with 7.1 mL of acetonitrile. The washing step by liquid-liquid extraction with heptane and acetonitrile was repeated once more, then the heptane layer was concentrated under reduced pressure, and the resulting residue was purified by silica gel chromatography (heptane:ethyl acetate=15:1 to ethyl acetate) to afford 1.13 g of TIPS6-Dpm-NH$_2$ (yield: 92.2%).

$^1$H-NMR (400 MHz, Benzene-d$_6$) δ1.15-1.20 (m, 126H), 1.23-1.38 (m, 24H), 1.60-1.82 (m, 10H), 2.19 (t, 4H), 3.70 (t, 4H), 4.43 (s, 12H), 4.97 (s, 1H), 5.90 (s, 2H), 6.87-6.92 (m, 4H), 7.32-7.37 (m, 4H)

$^{13}$C-NMR (100 MHz, Benzene-d$_6$) δ12.7 (18C), 18.6 (36C), 26.6 (2C), 26.8 (2C), 29.8-30.3 (12C), 38.3 (2C), 59.4, 62.3 (6C), 62.8 (2C), 68.3 (2C), 115.0 (4C), 128.7 (4C), 139.4 (2C), 159.0 (2C), 172.3 (2C)

Example 14

Synthesis of TIPS9-Dpm-NH$_2$

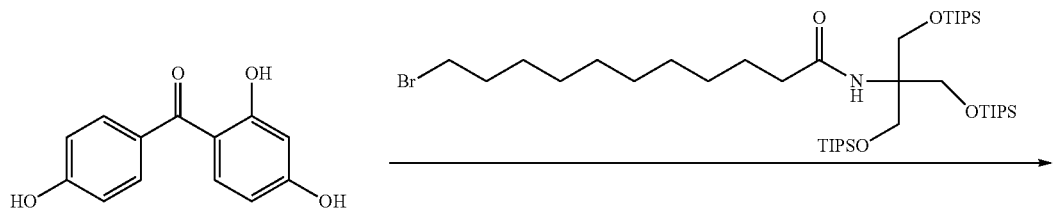

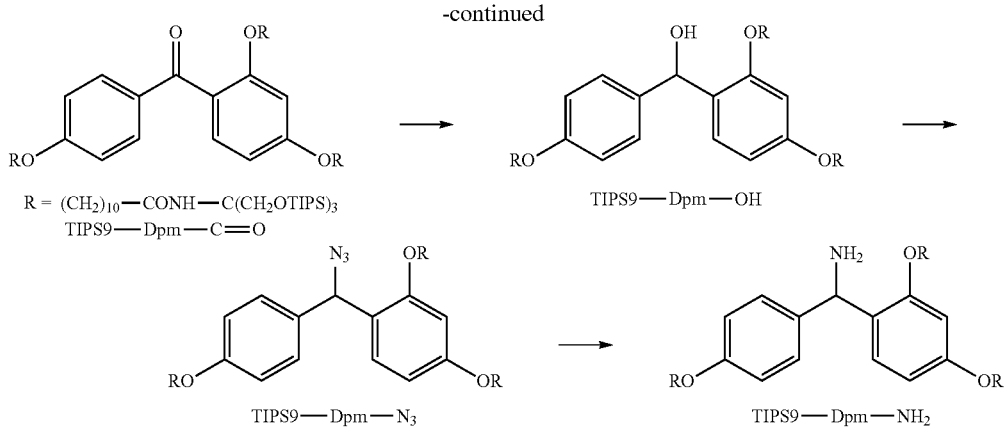

(Hereinafter, TIPS9-Dpm-C=O, TIPS9-Dpm-OH, TIPS9-Dpm-N$_3$, and TIPS9-Dpm-NH$_2$ represent the respective structures in the above scheme.)

(1) In 7.2 mL of DMF, 3.36 g of Br—(CH$_2$)$_{10}$—CONH—C(CH$_2$OTIPS)$_3$ (4.02 mmol), 0.25 g of 2,4,4'-trihydroxybenzophenone (1.09 mmol), and 0.75 g of potassium carbonate (5.43 mmol) was suspended, and the suspension was heated to 120° C. and stirred for 5 hours. The reaction solution was filtered, and the residue was washed with 15.2 mL of heptane. The filtrate was subjected to liquid-liquid extraction. To the resulting heptane layer was added 7.2 mL of heptane, and the solution was washed by liquid-liquid extraction with 7.2 mL of DMF. The washing step by liquid-liquid extraction with heptane and DMF was repeated once more. To the resulting heptane layer was added 7.2 mL of heptane, and the solution was washed by liquid-liquid extraction as follows: once with 7.2 mL of 1 N hydrochloric acid, once with 7.2 mL of 5% sodium hydrogencarbonate aqueous solution, and twice with 7.2 mL of water. To the resulting heptane layer was added 14.5 mL of heptane, and the solution was washed by liquid-liquid extraction as follows: once with 7.2 mL of DMF and twice with 7.2 mL of acetonitrile. The resulting heptane layer was concentrated under reduced pressure, and the resulting residue was purified by silica gel column chromatography (heptane:ethyl acetate=20:1 to 10:1) to give 1.81 g of TIPS9-Dpm-C=O (yield: 66.7%).

$^1$H-NMR (400 MHz, Benzene-d$_6$) δ1.15-1.20 (m, 189H), 1.23-1.38 (m, 36H), 1.50-1.82 (m, 12H), 2.16-2.26 (m, 6H), 3.58 (t, 2H), 3.63 (t, 2H), 3.73 (t, 2H), 4.43 (s, 18H), 5.91 (s, 3H), 6.42 (dd, 1H), 6.59 (d, 1H), 6.78-6.83 (m, 2H), 7.60 (d, 1H), 8.03-8.08 (m, 2H)

$^{13}$C-NMR (100 MHz, Benzene-d$_6$) δ12.7 (27C), 18.7 (54C), 26.5, 26.6 (3C), 26.7, 26.8, 29.7-30.4 (18C), 38.2 (3C), 62.3 (9C), 62.8 (3C), 68.5 (2C), 68.8, 101.0, 105.7, 114.4 (2C), 124.0, 132.3, 132.6 (2C), 133.2, 159.4, 163.1, 163.3, 172.3 (3C), 194.1

(2) In a mixed solution of 5.1 mL of THF (anhydrous) and 0.26 mL of methanol, 1.69 g of TIPS9-Dpm-C=O (0.68 mmol) was dissolved, and 31 mg of sodium borohydride (0.81 mmol) was added to the solution, followed by stirring for 2.5 hours. To the reaction solution was added 0.64 mL of 1 N hydrochloric acid to quench the reaction, 42 mL of CPME was added to the solution, and the solution was washed once with 13 mL of 1 N hydrochloric acid and three times with 13 mL of water. The organic layer was concentrated under reduced pressure. The resulting residue was dissolved in 42 mL of heptane, and the solution was washed by liquid-liquid extraction with 21 mL of DMF. To the resulting heptane layer was added 21 mL of heptane, and the solution was washed by liquid-liquid extraction with 21 mL of acetonitrile. The washing step by liquid-liquid extraction with heptane and acetonitrile was repeated once more, and then the heptane layer was concentrated under reduced pressure to give a mixture containing TIPS9-Dpm-OH.

(3) The mixture obtained in the foregoing step was dissolved in 13.5 mL of THF, and 0.74 g of bis(p-nitrophenyl)phosphoryl azide (2.03 mmol) and 0.30 mL of DBU (2.03 mmol) were added to the solution, followed by stirring at room temperature for 1 hour. The reaction solution was diluted with 39 mL of CPME, and the solution was washed by liquid-liquid extraction as follows: once with 13 mL of 5% sodium hydrogencarbonate aqueous solution and five times with 78 mL of water. The solution was concentrated under reduced pressure. The residue was dissolved in 27 mL of heptane, and the solution was washed by liquid-liquid extraction with 14 mL of DMF. To the resultant heptane layer was added 14 mL of heptane, and the solution was washed by liquid-liquid extraction with 7 mL of acetonitrile. The washing step by liquid-liquid extraction with heptane and acetonitrile was repeated once more, then the heptane layer was concentrated under reduced pressure, and the resulting residue was purified by silica gel column chromatography (heptane:ethyl acetate=30:1 to 20:1) to give 0.42 g of TIPS9-Dpm-N$_3$ (yield: 24.4%, 2 steps).

$^1$H-NMR (400 MHz, Benzene-d$_6$) δ1.15-1.20 (m, 139H), 1.23-1.38 (m, 36H), 1.50-1.82 (m, 12H), 2.16-2.26 (m, 6H), 3.56-3.70 (m, 4H), 3.73 (t, 2H), 4.43 (s, 18H), 5.90 (s, 3H), 6.27 (s, 1H), 6.45 (dd, 1H), 6.57 (d, 1H), 6.85-6.90 (m, 2H), 7.33-7.40 (m, 3H)

$^{13}$C-NMR (100 MHz, Benzene-d$_6$) δ12.7 (27C), 13.7 (54C), 26.6 (3C), 26.7, 26.9 (2C), 29.8-30.4 (18C), 38.3 (3C), 62.3 (9C), 62.8 (3C), 63.1, 68.3, 68.4, 68.5, 100.6, 105.4, 115.0 (2C), 121.8, 129.4 (2C), 129.9, 132.8, 158.2, 159.6, 161.2, 172.3 (3C)

(4) In 0.91 mL of THF, 0.35 g of TIPS9-Dpm-N$_3$ (0.14 mmol) was dissolved, and 0.11 g of triphenylphosphine (0.41 mmol) and 0.10 mL of water (5.50 mmol) were added to the solution, followed by stirring at 60° C. for 6 hours. The reaction solution was concentrated under reduced pressure. The residue was dissolved in 2.8 mL of heptane, and the solution was washed by liquid-liquid extraction with 1.4 mL of DMF. The washing step by liquid-liquid extraction with heptane and DMF was further repeated twice. Then, 1.4 mL of heptane was added to the heptane layer, and the solution was washed by liquid-liquid extraction with 1.4 mL of acetonitrile/water mixture (50/50). The washing step by liquid-liquid extraction with heptane and acetonitrile/water mixture (50/50) was repeated once more. To the resulting heptane layer was added 1.4 mL of heptane, and the solution was washed by liquid-liquid extraction with 1.4 mL of acetonitrile. The washing step by liquid-liquid extraction with heptane and acetonitrile was repeated once more, then the heptane layer was concentrated under reduced pressure, and the resulting residue was purified by silica gel chromatography (heptane:ethyl acetate=17:1 to ethyl acetate) to afford 0.25 g of TIPS9-Dpm-NH$_2$ (yield: 94.6%).

$^1$H-NMR (400 MHz, Benzene-d$_6$) δ1.15-1.20 (m, 189H), 1.23-1.38 (m, 36H), 1.50-1.82 (m, 14H), 2.16-2.26 (m, 6H), 3.58-3.68 (m, 2H), 3.73 (t, 2H), 3.79 (t, 2H), 4.43 (s, 18H), 5.62 (s, 1H), 5.90 (s, 3H), 6.53 (dd, 1H), 6.60 (d, 1H), 6.93-6.99 (m, 2H), 7.52 (d, 1H), 7.55-7.61 (m, 2H)

$^{13}$C-NMR (100 MHz, Benzene-d$_6$) δ12.7 (27C), 18.7 (54C), 26.6 (3C), 26.8, 26.9 (2C), 29.8-30.4 (18C), 38.3 (3C), 53.9, 62.3 (9C), 62.8 (3C), 68.3 (2C), 68.4, 100.7, 105.1, 114.7 (2C), 128.3, 128.9, 129.1 (2C), 139.0, 158.0, 158.9, 160.2, 172.3 (3C)

Example 15

Synthesis of Fmoc-D-Ala-NH-(TIPS2-Dpm)

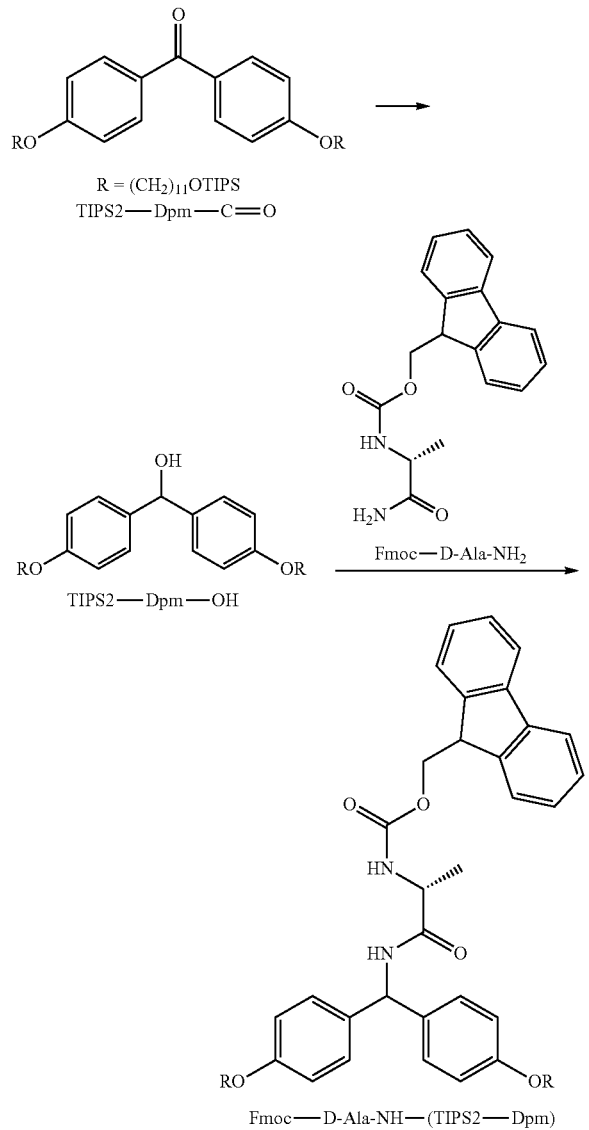

(Hereinafter, Fmoc-D-Ala-NH-(TIPS2-Dpm) represents the structure in the above scheme.)

(1) In a mixed solution of 395 mL of THF (anhydrous) and 19.8 mL of methanol, 45.0 g of TIPS2-Dpm-C=O (51.9 mmol) was dissolved, and 2.36 g of sodium borohydride (62.3 mmol) was added to the solution, followed by stirring for 3 hours 30 minutes. To the reaction solution was added 49.3 mL of 1 N hydrochloric acid to quench the reaction, 1125 mL of CPME was added to the solution, and the solution was washed twice with 340 mL of 1 N hydrochloric acid and once with 340 mL of 20% sodium chloride aqueous solution. To the organic layer was added 45.1 g of anhydrous magnesium sulfate, and the mixture was stirred sufficiently, followed by filtration. The filtrate was concentrated under reduced pressure to give a mixture containing TIPS2-Dpm-OH.

(2) The mixture obtained in the foregoing step was dissolved in 695 mL of toluene, and 19.3 g of Fmoc-D-Ala-NH$_2$ (62.3 mmol) and 168 μL of methanesulfonic acid (2.6 mmol) were added to the solution, followed by stirring at 100° C. for 1 hour. The reaction solution was cooled to 27° C., and 474 μL of DIPEA (2.7 mmol) was added to the solution to quench the reaction. The solution was diluted with 68 mL of CPME and 2250 mL of heptane, and the solution was washed once by liquid-liquid extraction with 2250 mL of a mixture of methanol/water=8/2. To the resulting organic layer was added 68 mL of CPME, the solution was washed once by liquid-liquid extraction with 1125 mL of a mixture of methanol/water=8/2, and the organic layer was concentrated under reduced pressure. The resulting residue was dissolved in 180 mL of THF, and the solution was concentrated under reduced pressure again. The residue was dissolved in 113 mL of THF. To the solution was added 2251 mL of methanol, and the resulting precipitate was filtered. The precipitate was further washed with 2251 mL of methanol, and the precipitate was filtered again. The precipitate was dried under reduced pressure to afford 48.8 g of Fmoc-D-Ala-NH-(TIPS2-Dpm) (yield: 81.0%, 2 steps).

$^1$H-NMR (400 MHz, CDCl$_3$) δ1.04-1.08 (m, 42H), 1.23-1.48 (m, 31H), 1.49-1.59 (m, 4H), 1.67-1.80 (m, 4H), 3.67 (t, 4H), 3.82 (t, 2H), 3.89 (t, 2H), 4.16 (t, 2H), 4.30 (t, 1H), 4.37-4.44 (m, 1H), 5.39 (d, 1H), 6.10 (d, 1H), 6.65 (d, 1H), 6.78 (dd, 4H), 7.04-7.12 (m, 4H), 7.25-7.32 (m, 2H), 7.39 (t, 2H), 7.55 (t, 2H), 7.76 (d, 2H)

$^{13}$C-NMR (100 MHz, CDCl$_3$) δ 12.2 (6C), 18.2 (13C), 26.0 (2C), 26.2 (2C), 29.4-29.8 (12C), 33.2 (2C), 47.2, 50.7, 56.1, 63.7 (2C), 67.3, 68.1, 68.2, 114.7 (4C), 120.1 (2C), 125.2 (2C), 127.3 (2C), 127.9 (2C), 128.5 (4C), 133.4, 133.5, 141.4 (2C), 143.8, 144.0, 156.2, 158.6 (2C), 171.1

Example 16

Synthesis of Fmoc-Cys(TIPS2-Dpm)-NH$_2$ and Deprotection

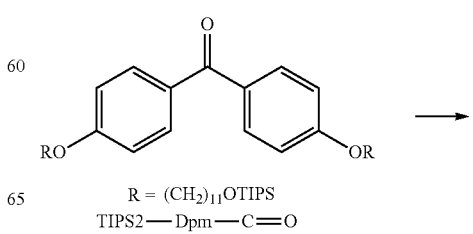

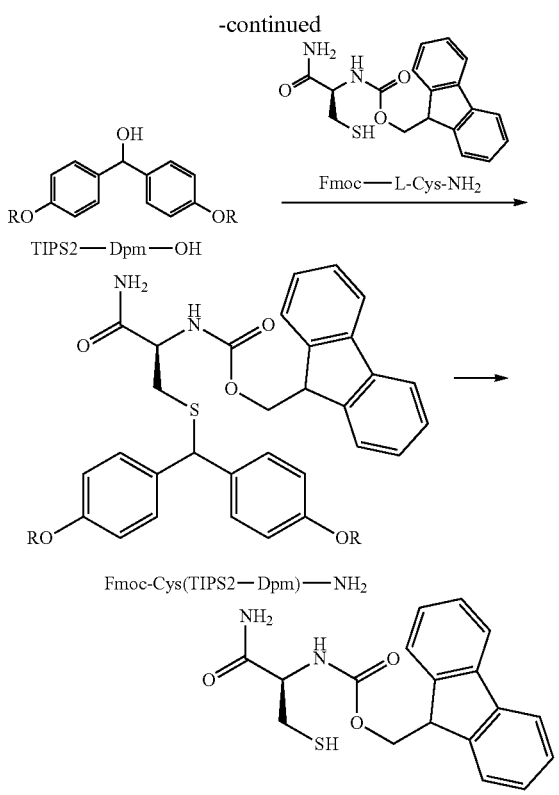

(Hereinafter, Fmoc-Cys(TIPS2-Dpm)-NH$_2$ represents the structure in the above scheme.)

(1) In a mixed solution of 3.1 mL of THF (anhydrous) and 0.15 mL of methanol, 0.35 g of TIPS2-Dpm-C═O (0.40 mmol) was dissolved, and 18 mg of sodium borohydride (0.48 mmol) was added to the solution, followed by stirring for 3 hours. To the reaction solution was added 0.38 mL of 1 N hydrochloric acid to quench the reaction, 8.7 mL of CPME was added to the solution, and the solution was washed twice with 2.6 mL of 1 N hydrochloric acid and once with 2.6 mL of 20% sodium chloride aqueous solution. To the organic layer was added 0.35 g of anhydrous magnesium sulfate, and the mixture was stirred sufficiently, followed by filtration. The filtrate was concentrated under reduced pressure to give a mixture containing TIPS2-Dpm-OH.

(2) The mixture obtained in the foregoing step was dissolved in 5.4 mL of toluene, and 0.14 g of Fmoc-L-Csy-NH$_2$ (0.41 mmol) and 1.3 µL of methanesulfonic acid (0.02 mmol) were added to the solution, followed by stirring at 100° C. for 30 minutes. The reaction solution was cooled to 5° C., and 3.7 µL of DIPEA (0.02 mmol) was added to the solution to quench the reaction. The solution was diluted with 0.5 mL of CPME and 17.4 mL of heptane, and the solution was washed once by liquid-liquid extraction with 17.4 mL of a mixture of methanol/water=8/2. To the resulting organic layer was added 0.5 mL of CPME, the solution was washed once by liquid-liquid extraction with 8.7 mL of a mixture of methanol/water=8/2, and the organic layer was concentrated under reduced pressure. The resulting residue was dissolved in 1.4 mL of THF, and the solution was concentrated under reduced pressure again. To the residue was added 17.5 mL of methanol, the mixture was cooled to 5° C., and then the solvent and the precipitate were separated by decantation. To the precipitate was added 8.7 mL of methanol, the mixture was cooled to 5° C., and the solvent and the precipitate were separated by decantation. The precipitate was dried under reduced pressure to give 0.48 g of Fmoc-Cys(TIPS2-Dpm)-NH$_2$ (yield: 99.8%, 2 steps).

$^1$H-NMR (400 MHz, CDCl$_3$) δ1.03-1.09 (m, 42H), 1.24-1.48 (m, 28H), 1.51-1.59 (m, 4H), 1.70-1.80 (m, 4H), 2.77 (d, 2H), 3.68 (t, 4H), 3.85-3.94 (m, 4H), 4.22 (t, 1H), 4.26-4.34 (m, 1H), 4.45 (d, 2H), 5.17 (s, 1H), 5.60 (s, 2H), 6.12 (s, 1H), 6.78-6.85 (m, 4H), 7.26-7.34 (m, 6H), 7.41 (t, 2H), 7.56-7.64 (m, 2H), 7.78 (d, 2H)

$^{13}$C-NMR (100 MHz, CDCl$_3$) δ12.2 (6C), 18.2 (12C), 26.0 (2C), 26.2 (2C), 29.4-29.8 (12C), 33.2 (2C), 34.4, 47.3, 51.0, 53.5, 63.7 (2C), 67.3, 68.1, 68.2, 114.6 (2C), 114.7 (2C), 120.2 (2C), 125.2 (2C), 127.3 (2C), 127.9 (2C), 129.4 (2C), 129.5 (2C), 133.0 (2C), 141.5 (2C), 143.8 (2C), 156.1, 158.5 (2C), 172.6

(3) In 5.34 mL of dichloromethane, 0.40 g of Fmoc-Cys(TIPS2-Dpm)-NH$_2$ (0.34 mmol) was dissolved, and 0.34 mL of 3,6-dioxa-1,8-octanedithiol (2.07 mmol), 0.34 mL of triisopropylsilane (1.56 mmol), and 0.67 mL of trifluoroacetic acid (8.81 mmol) were added to the solution, followed by stirring at room temperature for 20 minutes. After observing disappearance of Fmoc-Cys(TIPS2-Dpm)-NH$_2$, the reaction solution was concentrated under reduced pressure. To 27 mL of diisopropyl ether cooled to 5° C. was added dropwise the residue, and the resulting precipitate was filtered. This washing with diisopropyl ether and filtration was further repeated three times. The resulting precipitate was dried under reduced pressure to afford 0.090 g of Fmoc-L-Cys-NH$_2$.

$^1$H-NMR (400 MHz, DMSO-d$_6$) δ2.27 (t, 1H), 2.60-2.90 (m, 2H), 4.01-4.11 (m, 1H), 4.18-4.38 (m, 3H), 7.15 (s, 1H), 7.33 (t, 2H), 7.37-7.52 (m, 4H), 7.74 (dd, 2H), 7.89 (d, 2H)

$^{13}$C-NMR (100 MHz, DMSO-d$_6$) δ26.2, 46.7, 57.1, 65.7, 120.1 (2C), 125.3 (2C), 127.1 (2C), 127.6 (2C), 140.7 (2C), 143.8, 143.9, 156.0, 171.9

Example 17

Evaluation of Ability in Increasing Solubility of Peptide Compounds

Results of measurement of solubility of a compound protected with a diphenylmethane protective agent of the present invention are shown in FIG. 1.

Peptide used as model: H-Gly-Gly-Gly-NH$_2$

H-Gly-Gly-Gly-NH$_2$ and H-Gly-Gly-Gly-NH-(TIPS2-Dpm) were synthesized, CPME (cyclopentyl methyl ether) was saturated with each of the compounds at 25° C., and the solubility was measured.

As a result, merely 0.039 mM of H-Gly-Gly-Gly-NH$_2$ to which a TIPS-type protective agent was not bonded was dissolved in CPME. On the other hand, 426 mM of the peptide to which TIPS2-Dpm-NH$_2$ was bonded was dissolved, that is, the compound led to about 10,000-fold or more increase in solubility. The results are shown in FIG. 1. The results demonstrate that solubility of a peptide is significantly increased by derivatization using the diphenylmethane protective agent. H-Gly-Gly-Gly-NH$_2$ and H-Gly-Gly-Gly-NH-(TIPS2-Dpm) represent the following structures.

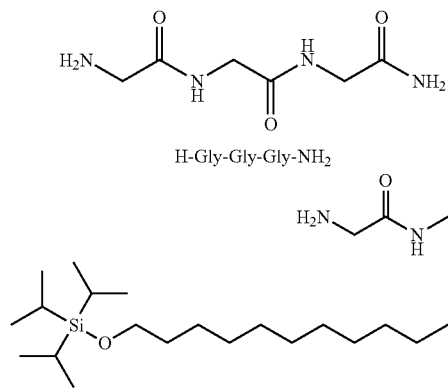

H-Gly-Gly-Gly-NH$_2$

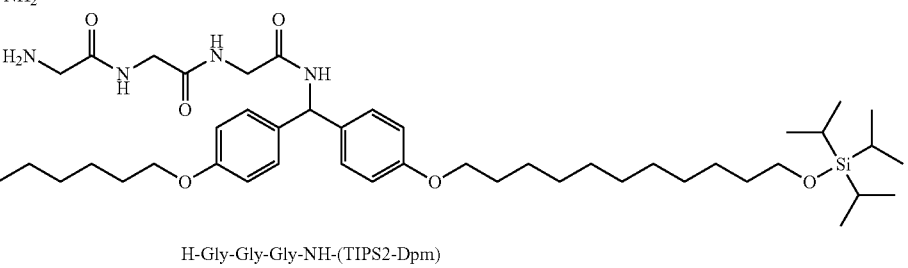

H-Gly-Gly-Gly-NH-(TIPS2-Dpm)

Example 18

Synthesis of H-Gly-Gly-Gly-NH-(TIPS2-Dpm)

In 3.3 mL of CPME, 0.44 g of TIPS2-Dpm-NH$_2$ (0.50 mmol) was dissolved, and 0.8 mL of DMF, 0.43 mL of DIPEA (2.47 mmol), 0.27 g of Fmoc-Gly-OH (0.89 mmol), and 0.16 g of WSCI.HCl (0.84 mmol) were added to the solution, followed by stirring at room temperature for 45 minutes. After observing disappearance of TIPS2-Dpm-NH$_2$, 79 µL of 2-(2-aminoethoxy)ethanol (0.79 mmol) was added to the solution, followed by stirring at room temperature for 15 minutes. To the reaction solution was added 0.32 g of sodium 3-mercapto-1-propanesulfonate (1.78 mmol) the solution was washed by liquid-liquid extraction. To the resulting organic layer were added 9.7 mL of 20% sodium chloride aqueous solution, 0.26 mL of DMSO, and 0.26 mL of DMF, and the solution was washed by liquid-liquid extraction. The solution was concentrated under reduced pressure, the residue was dissolved in 17.5 mL of heptane, and the solution was washed twice by liquid-liquid extraction with 17.5 mL of acetonitrile/water mixture (90/10). The heptane layer was concentrated under reduced pressure, and the residue was dried under reduced pressure to give a mixture containing H-Gly-NH-(TIPS2-Dpm). Fmoc-Gly-NH-(TIPS2-Dpm) and H-Gly-NH-(TIPS2-Dpm) represent the following structures.

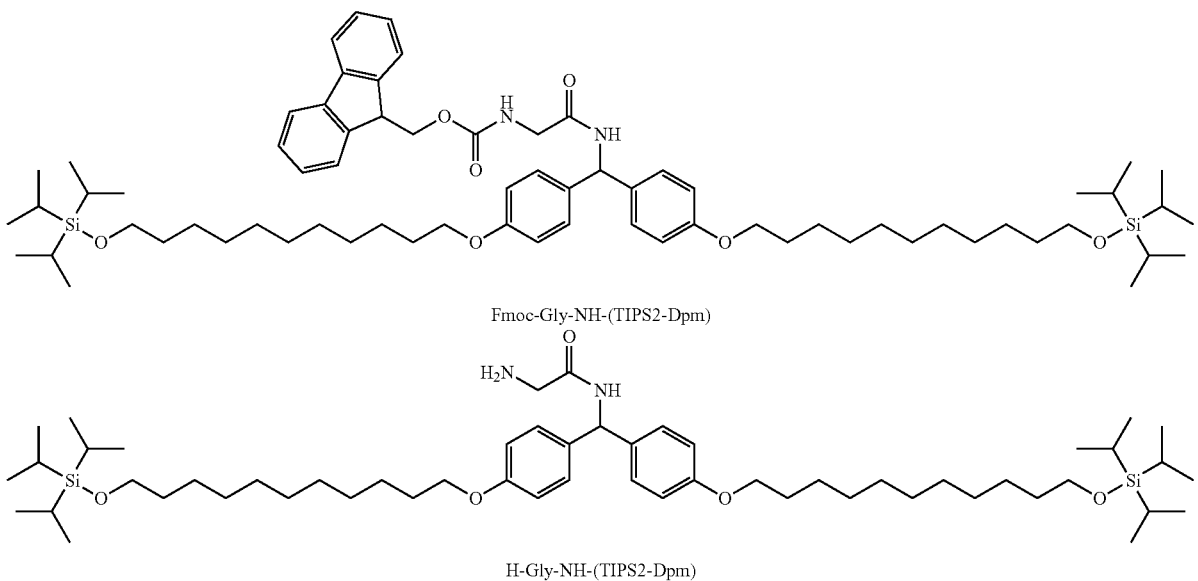

Fmoc-Gly-NH-(TIPS2-Dpm)

H-Gly-NH-(TIPS2-Dpm)

dissolved in 1.6 mL of DMSO, and 0.60 mL of DBU (4.01 mmol) was added to the solution, followed by stirring for 30 minutes. After observing disappearance of Fmoc-Gly-NH-(TIPS2-Dpm), the solution was cooled to 5° C., and then 1.59 mL of 4 M CPME/HCl (5.93 mmol) was added dropwise to the solution. The solution was heated to room temperature, and 1.31 mL of CPME, 7.8 mL of 20% sodium chloride aqueous solution, and 6.7 mL of 10% sodium carbonate aqueous solution were added to the solution, and To the resulting mixture were added 3.2 mL of CPME, 0.8 mL of DMF, 0.42 mL of DIPEA (2.41 mmol), 0.22 g of Fmoc-Gly-Gly-OH (0.63 mmol), and 0.25 g of COMU (0.58 mmol), followed by stirring at room temperature for 1 hour 15 minutes. After observing disappearance of H-Gly-NH-(TIPS2-Dpm), 29 µL of 2-(2-aminoethoxy)ethanol (0.29 mmol) was added to the solution, followed by stirring at room temperature for 15 minutes. To the reaction solution was added 0.22 g of sodium 3-mercapto-1-propanesulfonate (1.26 mmol) dissolved in 1.2 mL of DMSO, and 0.49 mL of DBU (3.31 mmol) was added to the solution, followed by stirring for 30 minutes. After observing disappearance of Fmoc-Gly-Gly-Gly-NH-(TIPS2-Dpm), the solution was cooled to 5° C., and then 1.23 mL of 4M CPME/HCl (4.85 mmol) was added dropwise to the solution. The solution was heated to room temperature, 1.34 mL of CPME, 6.4 mL of 20% sodium chloride aqueous solution, and 5.6 mL of 10% sodium carbonate aqueous solution were added to the solution, and the solution was washed by liquid-liquid extraction. To the resulting organic layer were added 4.2 mL of 50% dipotassium hydrogen phosphate aqueous solution, 0.11 mL of DMSO, and 0.11 mL of DMF, and the solution was washed by liquid-liquid extraction. To the resulting organic layer were added 4.2 mL of 50% dipotassium hydrogen phosphate aqueous solution, 0.11 mL of DMSO, and 0.11 mL of DMF, and the solution was washed by liquid-liquid extraction. The solution was concentrated under reduced pressure, the residue was dissolved in 17.9 mL of heptane, and the solution was washed by liquid-liquid extraction as follows: twice with 17.9 mL of acetonitrile/water mixture (90/10), once with 17.9 mL of water, and once with 17.9 mL of acetonitrile/water mixture (90/10). The heptane layer was concentrated under reduced pressure, and the residue was dried under reduced pressure to afford 0.36 g of H-Gly-Gly-Gly-NH-(TIPS2-Dpm). ESIMS MH+ 1039.9

Fmoc-Gly-Gly-Gly-NH-(TIPS2-Dpm) represents the following structure.

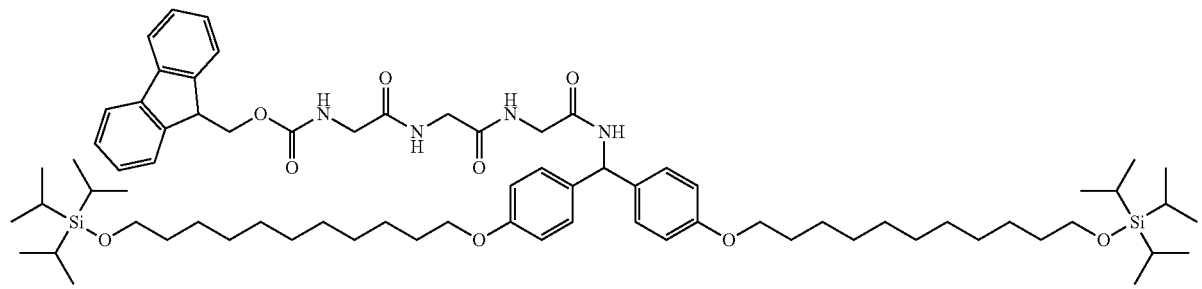

Fmoc-Gly-Gly-Gly-NH-(TIPS2-Dpm)

Example 19

Synthesis of H-Gly-Gly-Gly-NH$_2$

To 51.0 mg of H-Gly-Gly-Gly-NH-(TIPS2-Dpm) (0.049 mmol) were added 0.932 mL of trifluoroacetic acid (12.17 mmol), 25 µL of 3,6-dioxa-1,8-octanedithiol (0.151 mmol), and 25 µL of triisopropylsilane (0.114 mmol), followed by stirring at room temperature for 2 hours. After observing disappearance of H-Gly-Gly-Gly-NH-(TIPS2-Dpm), the reaction solution was concentrated under reduced pressure. To 3.4 mL of diisopropyl ether cooled to 5° C. was added dropwise the residue, and the resulting precipitate was filtered. This wash sing with diisopropyl ether and filtration was further repeated three times. The resulting precipitate was dried under reduced pressure to afford 14.8 mg of H-Gly-Gly-Gly-NH$_2$. ESIMS MK+ 226.9

The above results demonstrate that solubility in an organic solvent of a compound in which a functional group is protected using a diphenylmethane protective agent of the present invention is significantly increased.

The invention claimed is:

1. A method for protecting a functional group, comprising:
reacting a protecting compound with a compound having a functional group selected from the group consisting of a carboxy group, a hydroxy group, a diol group, an amino group, an amide group, and a mercapto group, wherein the protecting compound is a diphenylmethane compound represented by formula (1):

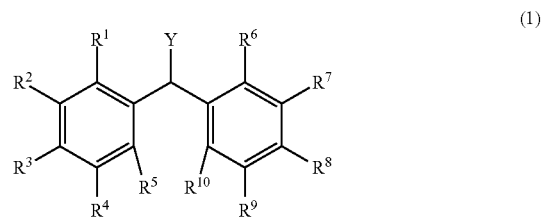

(1)

wherein, Y represents —OR$^{19}$ wherein R$^{19}$ represents a hydrogen atom or an active ester-type protecting group, —NHR$^{20}$ wherein R$^{20}$ represents a hydrogen atom, a C$_{1-6}$ linear or branched alkyl group, or an aralkyl group, an azide, a halogen atom, an oxime combined with a methylene group, or a carbonyl group combined with a methylene group, at least one of R$^1$ to R$^{10}$ represents a group represented by formula (2):

—O—R$^{11}$—X-A    (2)

and the others of R$^1$ to R$^{10}$ each independently represent a hydrogen atom, a halogen atom, a C$_{1-4}$ alkyl group, or a C$_{1-4}$ alkoxy group; R$^{11}$ represents a C$_{1-16}$ linear or branched alkylene group; X represents O or CONR$^{21}$ wherein R$^{21}$ represents a hydrogen atom or a C$_{1-4}$ alkyl group; and A represents a group represented by formula (3), (4), (5), (6), (7), (8), (9), (10), (11), (12), or (13):

(3)

(4)
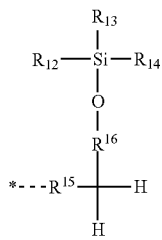

(5)
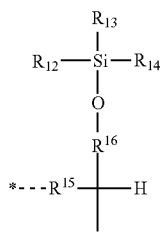

(6)
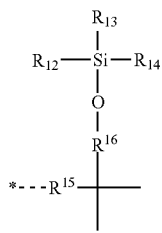

(7)
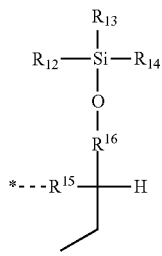

(8)
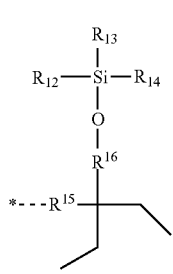

(9)
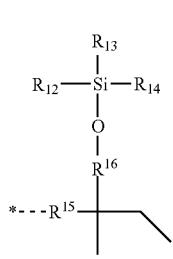

(10)
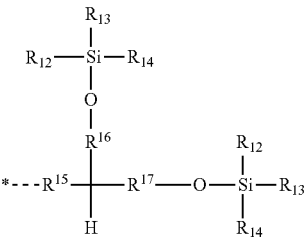

(11)
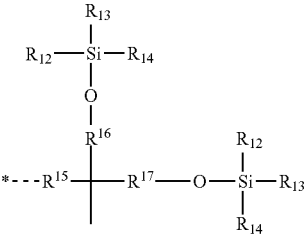

(12)
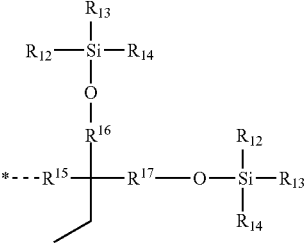

(13)
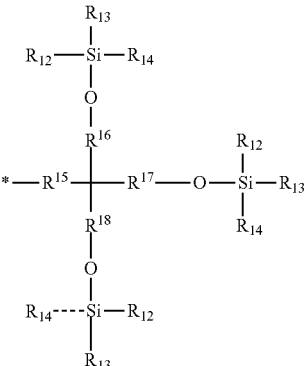

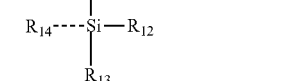

wherein $R^{12}$, $R^{13}$, and $R^{14}$ may be the same or different and each independently represent a $C_{1-6}$ linear or branched alkyl group or an optionally substituted aryl group; $R^{15}$ represents a single bond or a $C_{1-3}$ linear or branched alkylene group; and $R^{16}$, $R^{17}$, and $R^{18}$ each independently represent a $C_{1-3}$ linear or branched alkylene group, and wherein *--- represents a bonding to X.

2. The method according to claim 1, wherein the compound having the functional group is an amino acid or a peptide.

3. The method according to claim 1, wherein Y is —$OR^{19}$ wherein $R^{19}$ represents a hydrogen atom, —$NHR^{20}$ wherein $R^{20}$ represents a hydrogen atom, a $C_{1-6}$ linear or branched alkyl group, or an aralkyl group, an azide, a halogen atom, an oxime combined with a methylene group, or a carbonyl group combined with a methylene group.

4. The method according to claim 1, wherein Y is —$OR^{19}$ wherein $R^{19}$ represents a hydrogen atom or an active ester-type protecting group, —$NHR^{20}$ wherein $R^{20}$ represents a hydrogen atom, a $C_{1-6}$ linear or branched alkyl group, or an aralkyl group, an azide, a halogen atom, or an oxime combined with a methylene group.

5. The method according to claim 1, wherein Y is $-OR^{19}$ wherein $R^{19}$ represents a hydrogen atom, $-NHR^{20}$ wherein $R^{20}$ represents a hydrogen atom, a $C_{1-6}$ linear or branched alkyl group, or an aralkyl group, an azide, a halogen atom, or an oxime combined with a methylene group.

6. The method according to claim 1, wherein at least one of $R^1$ to $R^5$ and at least one of $R^6$ to $R^{10}$ are each independently a group represented by formula (2), and the others of $R^1$ to $R^5$ and $R^6$ to $R^{10}$ are each independently a hydrogen atom, a $C_{1-4}$ alkyl group, or a $C_{1-4}$ alkoxy group.

7. The method according to claim 1, wherein $R^{11}$ is a $C_{2-16}$ linear or branched alkylene group.

8. The method according to claim 1, wherein $R^{11}$ is a $C_{6-16}$ linear or branched alkylene group.

9. The method according to claim 1, wherein $R^{15}$ is a single bond or a methylene group, and $R^{16}$, $R^{17}$, and $R^{18}$ are each independently a methylene group.

10. A peptide producing method in a liquid phase, comprising:
reacting in a soluble solvent an amino acid or a peptide in which a functional group selected from the group consisting of a carboxy group, a hydroxy group, a diol group, an amino group, an amide group, and a mercapto group is protected by a protecting compound with an amino acid or a peptide in which a functional group which differs from the aforementioned functional group is protected,
wherein the protecting compound is a diphenylmethane compound represented by formula (1):

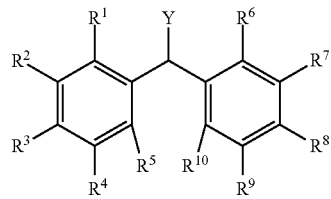

(1)

wherein, Y represents $-OR^{19}$ wherein $R^{19}$ represents a hydrogen atom or an active ester-type protecting group, $-NHR^{20}$ wherein $R^{20}$ represents a hydrogen atom, a $C_{1-6}$ linear or branched alkyl group, or an aralkyl group, an azide, a halogen atom, an oxime combined with a methylene group, or a carbonyl group combined with a methylene group, at least one of $R^1$ to $R^{10}$ represents a group represented by formula (2):

$-O-R^{11}-X-A$ (2)

and the others of $R^1$ to $R^{10}$ each independently represent a hydrogen atom, a halogen atom, a $C_{1-4}$ alkyl group, or a $C_{1-4}$ alkoxy group; $R^{11}$ represents a $C_{1-16}$ linear or branched alkylene group; X represents O or $CONR^{21}$ wherein $R^{21}$ represents a hydrogen atom or a $C_{1-4}$ alkyl group; and A represents a group represented by formula (3), (4), (5), (6), (7), (8), (9), (10), (11), (12), or (13):

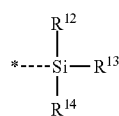

(3)

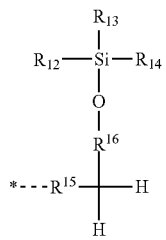

(4)

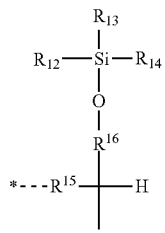

(5)

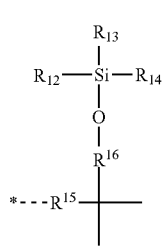

(6)

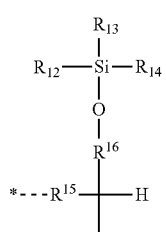

(7)

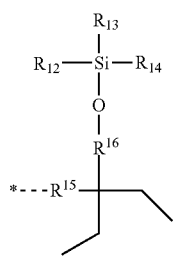

(8)

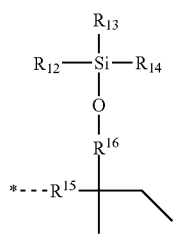

(9)

-continued

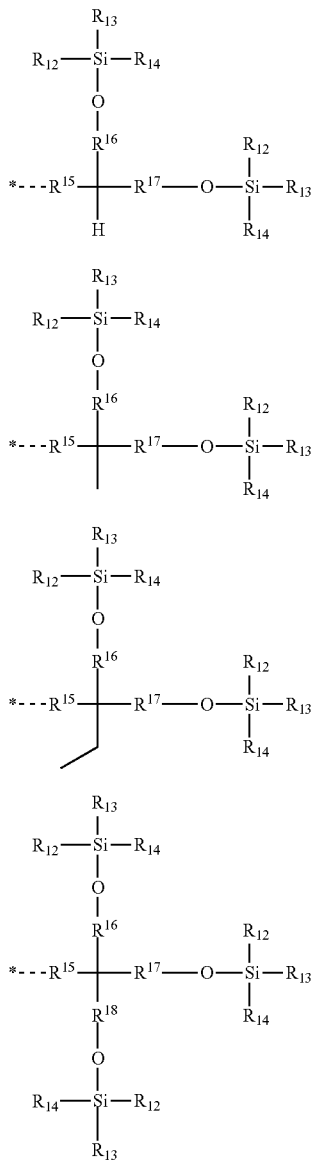

wherein $R^{12}$, $R^{13}$, and $R^{14}$ may be the same or different and each independently represent a $C_{1-6}$ linear or branched alkyl group or an optionally substituted aryl group; $R^{15}$ represents a single bond or a $C_{1-3}$ linear or branched alkylene group; and $R^{16}$, $R^{17}$, and $R^{18}$ each independently represent a $C_{1-3}$ linear or branched alkylene group, and wherein *--- represents a bonding to X.

11. The method according to claim 10, comprising the following steps (1) to (4):
(1) condensing the diphenylmethane compound of formula (1) with the C-terminal carboxy group of an N-protected amino acid or N-protected peptide in a soluble solvent to obtain an N-protected C-protected amino acid or N-protected C-protected peptide in which the C-terminal is protected by the diphenylmethane compound of formula (1);
(2) removing the protecting group on the N-terminal of the resulting N-protected C-protected amino acid or N-protected C-protected peptide to obtain a C-protected amino acid or C-protected peptide;
(3) condensing an N-protected amino acid or N-protected peptide with the N-terminal of the resulting C-protected amino acid or C-protected peptide to obtain an N-protected C-protected peptide; and
(4) removing the protecting group on the N-terminal and the protecting group on the C-terminal of the resulting N-protected C-protected peptide to obtain a target peptide.

12. The method according to claim 10, wherein Y is —$OR^{19}$ wherein $R^{19}$ represents a hydrogen atom, —$NHR^{20}$ wherein $R^{20}$ represents a hydrogen atom, a $C_{1-6}$ linear or branched alkyl group, or an aralkyl group, an azide, a halogen atom, an oxime combined with a methylene group, or a carbonyl group combined with a methylene group.

13. The method according to claim 10, wherein at least one of $R^1$ to $R^5$ and at least one of $R^6$ to $R^{10}$ are each independently a group represented by formula (2), and the others of $R^1$ to $R^5$ and $R^6$ to $R^{10}$ are each independently a hydrogen atom, a $C_{1-4}$ alkyl group, or a $C_{1-4}$ alkoxy group.

14. The method according to claim 10, wherein $R^{11}$ is a $C_{2-16}$ linear or branched alkylene group.

15. The method according to claim 10, wherein $R^{15}$ is a single bond or a methylene group, and $R^{16}$, $R^{17}$, and $R^{18}$ are each independently a methylene group.

16. A protected amino acid or protected peptide, wherein a functional group selected from the group consisting of a carboxy group, a hydroxy group, a diol group, an amino group, an amide group, and a mercapto group of an amino acid or a peptide is protected by a protecting compound, and wherein the protecting compound is a diphenylmethane compound represented by formula (1):

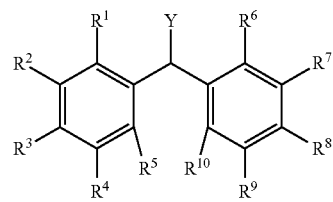

wherein, Y represents —$OR^{19}$ wherein $R^{19}$ represents a hydrogen atom or an active ester-type protecting group, —$NHR^{20}$ wherein $R^{20}$ represents a hydrogen atom, a $C_{1-6}$ linear or branched alkyl group, or an aralkyl group, an azide, a halogen atom, an oxime combined with a methylene group, or a carbonyl group combined with a methylene group, at least one of $R^1$ to $R^{10}$ represents a group represented by formula (2):

$$—O—R^{11}—X\text{-}A \qquad (2)$$

and the others of $R^1$ to $R^{10}$ each independently represent a hydrogen atom, a halogen atom, a $C_{1-4}$ alkyl group, or a $C_{1-4}$ alkoxy group; $R^{11}$ represents a $C_{1-16}$ linear or branched alkylene group; X represents O or $CONR^{21}$ wherein $R^{21}$ represents a hydrogen atom or a $C_{1-4}$ alkyl group; and A represents a group represented by formula (3), (4), (5), (6), (7), (8), (9), (10), (11), (12), or (13):

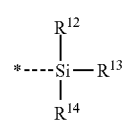

(4)
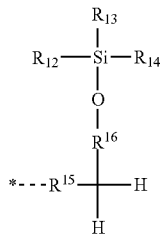

(5)
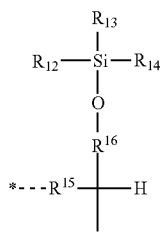

(6)
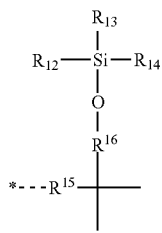

(7)
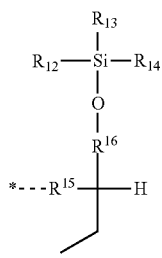

(8)
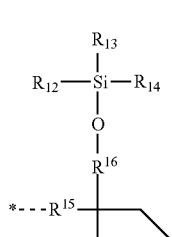

(9)
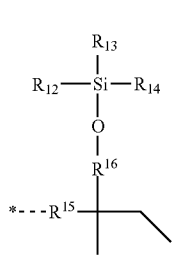

(10)
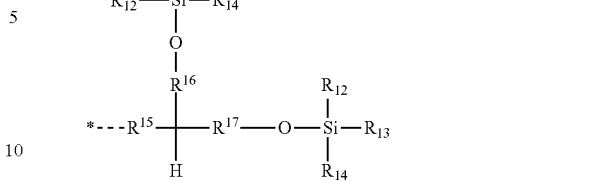

(11)
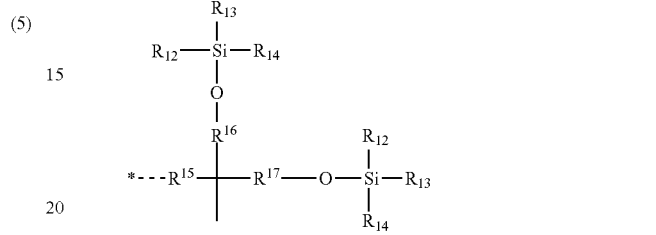

(12)
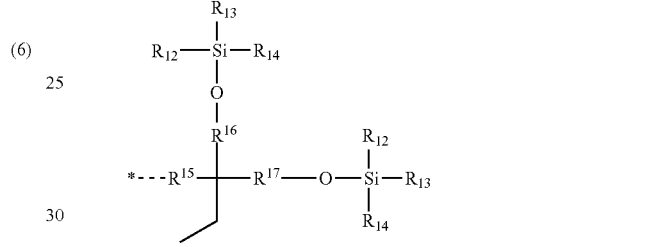

(13)
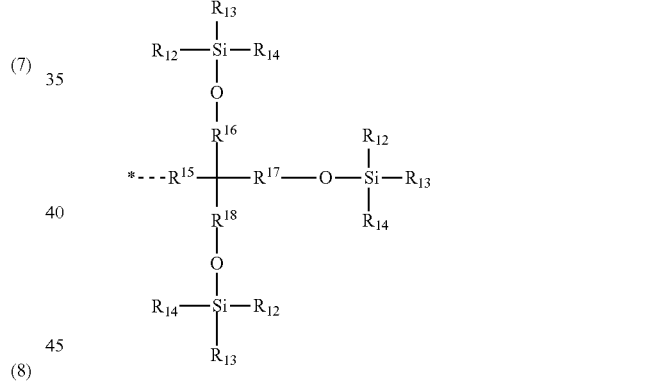

wherein $R^{12}$, $R^{13}$, and $R^{14}$ may be the same or different and each independently represent a $C_{1-6}$ linear or branched alkyl group or an optionally substituted aryl group; $R^{15}$ represents a single bond or a $C_{1-3}$ linear or branched alkylene group; and $R^{16}$, $R^{17}$, and $R^{18}$ each independently represent a $C_{1-3}$ linear or branched alkylene group, and wherein *--- represents a bonding to X.

17. The protected amino acid or protected peptide according to claim 16, wherein Y is —$OR^{19}$ wherein $R^{19}$ represents a hydrogen atom, —$NHR^{20}$ wherein $R^{20}$ represents a hydrogen atom, a $C_{1-6}$ linear or branched alkyl group, or an aralkyl group, an azide, a halogen atom, an oxime combined with a methylene group, or a carbonyl group combined with a methylene group.

18. The protected amino acid or protected peptide according to claim 16, wherein at least one of $R^1$ to $R^5$ and at least one of $R^6$ to $R^{10}$ are each independently a group represented by formula (2), and the others of $R^1$ to $R^5$ and $R^6$ to $R^{10}$ are each independently a hydrogen atom, a $C_{1-4}$ alkyl group, or a $C_{1-4}$ alkoxy group.

19. The protected amino acid or protected peptide according to claim 16, wherein $R^{11}$ is a $C_{2-16}$ linear or branched alkylene group.

20. The protected amino acid or protected peptide according to claim 16, wherein $R^{15}$ is a single bond or a methylene group, and $R^{16}$, $R^{17}$, and $R^{18}$ are each independently a methylene group.

\* \* \* \* \*